(12) United States Patent
Nakada et al.

(10) Patent No.: US 10,336,961 B2
(45) Date of Patent: Jul. 2, 2019

(54) VISCOSITY INDEX IMPROVER, LUBRICANT COMPOSITION, AND METHOD FOR MANUFACTURING LUBRICANT COMPOSITION

(71) Applicant: SANYO CHEMICAL INDUSTRIES, LTD., Kyoto (JP)

(72) Inventors: Shigekuni Nakada, Kyoto (JP); Ayumu Sakaguchi, Kyoto (JP); Satoshi Matsumoto, Kyoto (JP); Kenyuu Yoshida, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 0 days.

(21) Appl. No.: 15/559,124

(22) PCT Filed: Mar. 4, 2016

(86) PCT No.: PCT/JP2016/056827
§ 371 (c)(1),
(2) Date: Sep. 18, 2017

(87) PCT Pub. No.: WO2016/152463
PCT Pub. Date: Sep. 29, 2016

(65) Prior Publication Data
US 2018/0245014 A1   Aug. 30, 2018

(30) Foreign Application Priority Data
Mar. 20, 2015 (JP) .................. 2015-057603

(51) Int. Cl.
| | | |
|---|---|---|
| C10M 145/14 | (2006.01) | |
| C08F 220/18 | (2006.01) | |
| C08F 220/14 | (2006.01) | |
| C08F 220/68 | (2006.01) | |
| C10M 169/04 | (2006.01) | |

(52) U.S. Cl.
CPC ......... *C10M 145/14* (2013.01); *C08F 220/14* (2013.01); *C08F 220/18* (2013.01); *C08F 220/68* (2013.01); *C10M 169/041* (2013.01); *C08F 2220/1891* (2013.01); *C10M 2201/085* (2013.01); *C10M 2203/1006* (2013.01); *C10M 2205/0285* (2013.01); *C10M 2207/2825* (2013.01); *C10M 2209/084* (2013.01); *C10M 2215/064* (2013.01); *C10M 2215/08* (2013.01); *C10M 2215/28* (2013.01); *C10M 2217/022* (2013.01); *C10M 2219/042* (2013.01); *C10M 2219/046* (2013.01); *C10M 2219/06* (2013.01); *C10M 2225/02* (2013.01); *C10N 2220/021* (2013.01); *C10N 2220/022* (2013.01); *C10N 2230/02* (2013.01); *C10N 2230/08* (2013.01); *C10N 2230/52* (2013.01); *C10N 2230/68* (2013.01); *C10N 2230/70* (2013.01); *C10N 2240/04* (2013.01); *C10N 2240/042* (2013.01); *C10N 2240/044* (2013.01); *C10N 2240/045* (2013.01); *C10N 2240/046* (2013.01); *C10N 2240/08* (2013.01); *C10N 2240/10* (2013.01); *C10N 2240/102* (2013.01); *C10N 2240/104* (2013.01); *C10N 2260/02* (2013.01)

(58) Field of Classification Search
CPC ............ C10M 145/14; C10M 169/041; C10M 2209/084; C08F 220/14; C08F 220/68; C10N 2240/08; C10N 2240/045; C10N 2240/104; C10N 2240/044; C10N 2230/68; C10N 2240/042; C10N 2230/02; C10N 2240/102; C10N 2220/022
See application file for complete search history.

(56) References Cited

U.S. PATENT DOCUMENTS

| | | | |
|---|---|---|---|
| 2008/0194443 A1 | 8/2008 | Stohr et al. | |
| 2015/0175926 A1 | 6/2015 | Matsui et al. | |

FOREIGN PATENT DOCUMENTS

| | | |
|---|---|---|
| EP | 2 009 074 | 12/2008 |
| JP | 7-62372 | 3/1995 |
| JP | 2732187 | 3/1998 |
| JP | 2941392 | 8/1999 |

(Continued)

OTHER PUBLICATIONS

International Preliminary Report on Patentability dated Sep. 26, 2017 in International (PCT) Application No. PCT/JP2016/056827.

(Continued)

*Primary Examiner* — Taiwo Oladapo
(74) *Attorney, Agent, or Firm* — Wenderoth, Lind & Ponack, L.L.P.

(57) ABSTRACT

The present invention provides a viscosity index improver having an excellent viscosity index improving effect, a lubricant composition having excellent low-temperature viscosity in which the viscosity reduction due to long-term use is small, and a method for producing the lubricant composition. A viscosity index improver of the present invention contains a copolymer (A) containing, as monomer units, an alkyl (meth)acrylate (a) whose alkyl group contains 5 or more carbon atoms, and an alkyl (meth)acrylate (b) whose alkyl group contains 1 to 4 carbon atoms, wherein the alkyl group of the alkyl (meth)acrylate (a) whose alkyl group contains 5 or more carbon atoms has a molar-average carbon number (Q) of 29 or more, and the alkyl (meth)acrylate (b) whose alkyl group contains 1 to 4 carbon atoms is contained as a monomer unit in an amount of 38 to 75% by weight based on the weight of the copolymer (A).

16 Claims, No Drawings

(56) References Cited

FOREIGN PATENT DOCUMENTS

| | | |
|---|---|---|
| JP | 2004-307551 | 11/2004 |
| JP | 2005-200454 | 7/2005 |
| JP | 2008-546894 | 12/2008 |
| JP | 2012-188585 | 10/2012 |
| JP | 2013-177554 | 9/2013 |
| JP | 2014-152315 | 8/2014 |
| JP | 2014-152316 | 8/2014 |
| JP | 2014152315 A * | 8/2014 |
| JP | 2015-038194 | 2/2015 |
| WO | 2007/116759 | 10/2007 |
| WO | 2014/017554 | 1/2014 |

OTHER PUBLICATIONS

International Search Report dated Apr. 19, 2016 in International (PCT) Application No. PCT/JP2016/056827.

* cited by examiner

VISCOSITY INDEX IMPROVER, LUBRICANT COMPOSITION, AND METHOD FOR MANUFACTURING LUBRICANT COMPOSITION

RELATED APPLICATION

This application is a national stage entry of PCT/JP2016/056827, filed Mar. 4, 2016, which is a continuation of Japanese Patent Application No. 2015-057603, filed Mar. 20, 2015, which are incorporated by reference in their entirety.

TECHNICAL FIELD

The present invention relates to a viscosity index improver, a lubricant composition, and a method for producing a lubricant composition.

BACKGROUND ART

Lubricants such as ATF, CVTF, and MTF for transmissions of vehicles exhibit lower viscosity at higher temperatures. This means that the viscosity of these lubricants is highly temperature-dependent.

In practical applications, these lubricants are used in a wide temperature range from lower to higher temperatures. In the temperature range for use of these lubricants, changes in the viscosity of these lubricants are desirably minimized. In other words, higher viscosity indexes are preferred. As a means to improve fuel economy, a lubricant with lower viscosity has been recently used to reduce viscosity resistance. However, a lubricant with lower viscosity causes various problems such as oil leakage and seizure.

Meanwhile, use of a viscosity index improver has been proposed as another means to improve fuel economy. A lubricant having a higher viscosity index has lower viscosity resistance, which leads to improved fuel economy. Thus, it is a common practice to add a viscosity index improver to a lubricant to modify the temperature dependence of the viscosity. Known examples of such viscosity index improvers include methacrylate copolymers (Patent Literatures 1 to 4), an olefin copolymer (Patent Literature 5), and a macromonomer copolymer (Patent Literature 6).

Yet, the viscosity index improving effect of these lubricant compositions is still insufficient. In actual applications, these lubricant compositions exhibit insufficient shear stability after long hour drive and insufficient low-temperature characteristics at start-up.

CITATION LIST

Patent Literature

Patent Literature 1: JP-B 2732187
Patent Literature 2: JP-B 2941392
Patent Literature 3: JP-A H07-62372
Patent Literature 4: JP-A 2004-307551
Patent Literature 5: JP-A 2005-200454
Patent Literature 6: JP-A 2008-546894

SUMMARY OF INVENTION

Technical Problem

The present invention aims to provide a viscosity index improver having an excellent viscosity index improving effect, a lubricant composition having excellent low-temperature viscosity in which the viscosity reduction due to long-term use is small, and a method for producing the lubricant composition.

Solution to Problem

As a result of extensive studies, the present inventors arrived at the present invention. Specifically, the present invention relates to a viscosity index improver containing a copolymer (A) containing, as monomer units, an alkyl (meth)acrylate (a) whose alkyl group contains 5 or more carbon atoms, and an alkyl (meth)acrylate (b) whose alkyl group contains 1 to 4 carbon atoms, wherein the alkyl group of the alkyl (meth)acrylate (a) whose alkyl group contains 5 or more carbon atoms has a molar-average carbon number (Q) of 29 or more, and the alkyl (meth)acrylate (b) whose alkyl group contains 1 to 4 carbon atoms is contained as a monomer unit in an amount of 38 to 75% by weight based on the weight of the copolymer (A); a lubricant composition containing the viscosity index improver of the present invention and a lubricant base oil, wherein the lubricant base oil has a kinetic viscosity at 100° C. of 1.4 to 2.5 mm$^2$/s; and a method for producing a lubricant composition including a step of mixing the viscosity index improver of the present invention and a lubricant base oil having a kinetic viscosity at 100° C. of 1.4 to 2.5 mm$^2$/s.

Advantageous Effects of Invention

The present invention provides a viscosity index improver and a lubricant composition containing the viscosity index improver in which the viscosity index is high, the viscosity reduction due to long-term use is small, and the viscosity at low temperatures does not easily increase.

DESCRIPTION OF EMBODIMENTS

The viscosity index improver of the present invention contains a copolymer (A) containing, as monomer units, an alkyl (meth)acrylate (a) whose alkyl group contains 5 or more carbon atoms, and an alkyl (meth)acrylate (b) whose alkyl group contains 1 to 4 carbon atoms, wherein the alkyl group of the alkyl (meth)acrylate (a) whose alkyl group contains 5 or more carbon atoms has a molar-average carbon number (Q) of 29 or more, and the alkyl (meth)acrylate (b) whose alkyl group contains 1 to 4 carbon atoms is contained as a monomer unit in an amount of 38 to 75% by weight based on the weight of the copolymer (A).

The term "(meth)acrylate" means acrylate or methacrylate.

In the viscosity index improver of the present invention, the alkyl group of the alkyl (meth)acrylate (a) whose alkyl group contains 5 or more carbon atoms has a molar-average carbon number (Q) of 29 or more.

The term "molar-average carbon number (Q) of the alkyl group" means the molar average value of the carbon number of the alkyl group, and is calculated by the following mathematical formula (1).

[Math 1]

$$\text{(Molar-average carbon number }(Q)) = \frac{\sum\left(\frac{\text{Structural mass ratio of each monomer} \times \text{Carbon number of alkyl group of each monomer}}{\text{Molecular weight of each monomer}}\right)}{\sum\left(\frac{\text{Structural mass ratio of each monomer}}{\text{Molecular weight of each monomer}}\right)} \quad (1)$$

The molar-average carbon number (Q) of the alkyl group is 29 or more in terms of viscosity index and shear stability. The lower limit is preferably 30, more preferably 31, particularly preferably 32, and the upper limit is preferably 50, more preferably 45, particularly preferably 40.

In the present invention, the alkyl (meth)acrylate (a) whose alkyl group contains 5 or more carbon atoms preferably contains at least one selected from the group consisting of a monomer (a1) represented by the following formula (1), a monomer (a2) represented by the following formula (2), and an alkyl (meth)acrylate (a3) having a C5-C36 linear alkyl group.

First, a description is given for the monomer (a1).

[Chem. 1]

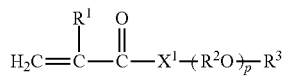

(1)

wherein $R^1$ is a hydrogen atom or a methyl group; $-X^1-$ is a group represented by $-O-$ or $-NH-$; $R^2$ is a C2-C4 linear or branched alkylene group, p is an integer of 0 to 20, structural units constituting $R^2$ may be the same or different from each other when p is 2 or more, and a moiety $(R^2O)_p$ may be bonded in a random or block manner; and $R^3$ is a C32-C44 branched alkyl group.

In formula (1), $R^1$ is a hydrogen atom or a methyl group. Of these, a methyl group is preferred in terms of viscosity index improving effect.

In formula (1), $-X^1-$ is a group represented by $-O-$ or $-NH-$. Of these, $-O-$ is preferred in terms of viscosity index improving effect.

In formula (1), $R^2$ is a C2-C4 linear or branched alkylene group, such as an ethylene group, a propylene group, or a butylene group. The propylene group may be exemplified by a 1,2- or 1,3-propylene group.

The butylene group may be exemplified by a 1,2-, 1,3- or a 1,4-butylene group. Of these, a C2-C3 linear or branched alkylene group, which is an ethylene group or a propylene group, is preferred in terms of viscosity index improving effect.

In formula (1), p is an integer of 0 to 20. It is preferably 0 to 5, more preferably 0 to 2, in terms of viscosity index improving effect and low-temperature viscosity. Structural units constituting $R^2$ may be the same or different from each other when p is 2 or more, and the moiety $(R^2O)_p$ may be bonded in a random or block manner.

A random bond is preferred in terms of low-temperature viscosity.

In formula (1), $R^3$ is a C32-C44 branched alkyl group. Examples of the C32-C44 branched alkyl group include 2-tetradecyloctadecyl group (C32), 2-tetradecylicosyl group (C34), 2-hexadecyloctadecyl group (C34), 2-hexadecylico-syl group (C36), 2-isohexadecylisoicosyl group (C36), 2-octadecyldocosyl group (C40), 2-icosyltetracosyl group (C44), and residues obtained by removing hydroxy groups from oxo alcohols derived from olefins (such as propylene oligomer (11- to 15-mers), ethylene/propylene oligomer (11- to 21-mers, molar ratio of 20/1 to 1/14), and isobutene oligomer (8- to 11-mers)).

In terms of solubility of the viscosity index improver in the lubricant base oil, the C32-C44 branched alkyl group is preferably a C32-C40 branched alkyl group, more preferably a C32-C36 branched alkyl group, particularly preferably a C32-C36 branched alkyl group wherein the alkyl group is branched at the 2-position.

Specific examples of the monomer (a1) include 2-tetradecyloctadecyl (meth)acrylate, 2-tetradecylicosyl (meth)acrylate, an ester of ethylene glycol mono-2-tetradecylicosyl group and a (meth)acrylic acid, 2-hexadecyloctadecyl (meth)acrylate, 2-hexadecylicosyl (meth)acrylate, 2-isohexadecylisoicosyl (meth)acrylate, 2-octadecyldocosyl (meth)acrylate, 2-icosyltetracosyl (meth)acrylate, and (meth)acrylic acids (propylene oligomer).

In terms of viscosity index and low-temperature viscosity, the monomer (a1) is preferably 2-tetradecyloctadecyl (meth)acrylate, 2-tetradecylicosyl (meth)acrylate, or 2-hexadecyloctadecyl (meth)acrylate, particularly preferably 2-tetradecyloctadecyl (meth)acrylate or 2-tetradecylicosyl (meth)acrylate, most preferably 2-tetradecyloctadecyl (meth)acrylate.

Next, a description is given for the monomer (a2).

[Chem. 2]

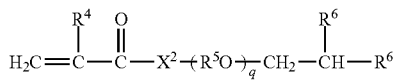

(2)

wherein R is a hydrogen atom or a methyl group; $-X^2-$ is a group represented by $-O-$ or $-NH-$; $R^5$ is a C2-C4 linear or branched alkylene group, p is an integer of 0 to 20, structural units constituting $R^5$ may be the same or different from each other when p is 2 or more, and a moiety $(R^5O)_q$ may be bonded in a random or block manner; and each $R^6$ is independently a C2-C14 linear or branched alkyl group.

In formula (2), $R^4$ is a hydrogen atom or a methyl group. Of these, a methyl group is preferred in terms of viscosity index.

In formula (2), $-X^2-$ is a group represented by $-O-$ or $-NH-$. Of these, a group represented by $-O-$ is preferred in terms of viscosity index.

In formula (2), $R^5$ is a C2-C4 linear or branched alkylene group, such as an ethylene group, a propylene group, or a butylene group. The propylene group may be exemplified by a 1,2- or 1,3-propylene group. The butylene group may be exemplified by a 1,2-, 1,3- or 1,4-butylene group.

In formula (2), q is an integer of 0 to 20. It is preferably 0 to 5, more preferably 0 to 2, in terms of viscosity index improving effect and low-temperature viscosity. Structural units constituting $R^5$ may be the same or different from each other when p is 2 or more, and the moiety $(R^5O)_q$ may be bonded in a random or block manner. A random bond is preferred in terms of low-temperature viscosity.

In formula (2), each $R^6$ is independently a C2-C14 linear or branched alkyl group. Examples of the C2-C14 linear or branched alkyl group include linear alkyl groups such as ethyl, n-propyl, n-butyl, n-pentyl, n-hexyl, n-heptyl, n-octyl, n-nonyl, n-decyl, n-undecyl, n-dodecyl, and n-tetradecyl groups; and branched alkyl groups such as isopropyl, isobutyl, isopentyl, isohexyl, isooctyl, isodecyl, isododecyl, and isotetradecyl groups.

In terms of viscosity index and low-temperature viscosity, the C2-C14 linear or branched alkyl group is preferably a C6-C14 linear or branched alkyl group, more preferably a C7-C14 linear or branched alkyl group, still more preferably a C8-C14 linear or branched alkyl group, particularly preferably a C8-C12 linear or branched alkyl group.

Specific examples of the monomer (a2) include 2-ethylbutyl (meth)acrylate, 2-butylhexyl (meth)acrylate, 2-hexyloctyl (meth)acrylate, 2-octyldecyl (meth)acrylate, an ester of ethylene glycol mono-2-octylpentadecyl ether and a (meth)acrylic acid, 2-octyldodecyl (meth)acrylate, 2-isooctylisododecyl (meth)acrylate, 2-n-decyltetradecyl (meth)acrylate, 2-isodecylisotetradecyl (meth)acrylate, 2-dodecylhexadecyl (meth)acrylate, 2-tetradecyloctadecyl (meth)acrylate, 2-dodecylpentadecyl (meth)acrylate, and N-2-octyldecyl (meth)acrylamide.

In terms of viscosity index and low-temperature viscosity, the monomer (a2) is preferably 2-octyldodecyl (meth)acrylate, 2-isooctylisododecyl (meth)acrylate, 2-n-decyltetradecyl (meth)acrylate, 2-isodecylisotetradecyl (meth)acrylate, 2-dodecylhexadecyl (meth)acrylate, or 2-tetradecyloctadecyl (meth)acrylate, particularly preferably 2-octyldodecyl (meth)acrylate, 2-isooctylisododecyl (meth)acrylate, 2-n-decyltetradecyl (meth)acrylate, or 2-isodecylisotetradecyl (meth)acrylate, most preferably 2-octyldodecyl (meth)acrylate, 2-n-decyltetradecyl (meth)acrylate, or 2-dodecylhexadecyl (meth)acrylate.

Next, a description is given for the alkyl (meth)acrylate (a3) having a C5-C36 linear alkyl group.

Specific examples of the alkyl (meth)acrylate (a3) having a C5-C36 linear alkyl group include pentyl (meth)acrylate, hexyl (meth)acrylate, heptyl (meth)acrylate, octyl (meth)acrylate, decyl (meth)acrylate, n-dodecyl (meth)acrylate, n-tridecyl (meth)acrylate, n-tetradecyl (meth)acrylate, n-pentadecyl (meth)acrylate, n-hexadecyl (meth)acrylate, n-octadecyl (meth)acrylate, n-icosyl (meth)acrylate, n-docosyl (meth)acrylate, n-tetracosyl (meth)acrylate, (meth)n-triacontyl (meth)acrylate, and n-hexatriacontyl (meth)acrylate.

In terms of viscosity index and low-temperature viscosity, the alkyl (meth)acrylate (a3) having a C5-C36 linear alkyl group is preferably an alkyl (meth)acrylate having a C12-C20 linear alkyl group, more preferably a (meth)acrylate having a C12-C18 linear alkyl group, particularly preferably a (meth)acrylate having a C14-C18 linear alkyl group.

In the present invention, the copolymer (A) contains a (meth)acrylate (b) having a C1-C4 linear alkyl group as a monomer unit.

Examples of the (meth)acrylate (b) having a C1-C4 linear alkyl group include methyl (meth)acrylate, ethyl (meth)acrylate, n-propyl (meth)acrylate, and n-butyl (meth)acrylate.

The (meth)acrylate (b) having a C1-C4 linear alkyl group is preferably a (meth)acrylate having a C1-C3 linear alkyl group, more preferably a methyl (meth)acrylate or a ethyl (meth)acrylate, particularly preferably a methyl (meth)acrylate.

The copolymer (A) may be a copolymer further containing, as a monomer unit, at least one selected from the group consisting of a nitrogen-containing vinyl monomer (e), a hydroxy group-containing vinyl monomer (f), and a phosphorus-containing vinyl monomer (g).

Examples of the nitrogen-containing vinyl monomer (e) include the following monomers (e1) to (e4), other than the monomer (a1) and the monomer (a2). These monomers are described below.

Amide Group-Containing Vinyl Monomer (e1):

Examples include those having a nitrogen atom only on an amide group, such as (meth)acrylamides, monoalkylamino (meth)acrylamides, monoalkylaminoalkyl (meth)acrylamides, dialkylamino (meth)acrylamides, dialkylaminoalkyl (meth)acrylamides, and N-vinyl carboxylic acid amides.

Examples of monoalkylamino (meth)acrylamides include those in which one C1-C4 alkyl group is bonded to the nitrogen atom; such as N-methyl (meth)acrylamide, N-ethyl (meth)acrylamide, N-isopropyl (meth)acrylamide, and N-n- or isobutyl (meth)acrylamide.

Examples of monoalkylaminoalkyl (meth)acrylamides include those having an aminoalkyl group (C2-C6) in which one C1-C4 alkyl group is bonded to the nitrogen atom; such as N-methylaminoethyl (meth)acrylamide, N-ethylaminoethyl (meth)acrylamide, N-isopropylamino-n-butyl (meth)acrylamide, and N-n- or isobutylamino-n-butyl (meth)acrylamide.

Examples of dialkylamino (meth)acrylamides include those in which two C1-C4 alkyl groups are bonded to the nitrogen atom; such as N,N-dimethyl (meth)acrylamide, N,N-diethyl (meth)acrylamide, N,N-diisopropyl (meth)acrylamide, and N,N-di-n-butyl (meth)acrylamide.

Examples of dialkylaminoalkyl (meth)acrylamides include those having an aminoalkyl group (C2-C6) in which two C1-C4 alkyl groups are bonded to the nitrogen atom; such as N,N-dimethylaminoethyl (meth)acrylamide, N,N-diethylaminoethyl (meth)acrylamide, N,N-dimethylaminopropyl (meth)acrylamide, and N,N-di-n-butylaminobutyl (meth)acrylamide.

Examples of N-vinyl carboxylic acid amides include N-vinylformamide, N-vinylacetamide, N-vinyl-n- or isopropionylamide, and N-vinylhydroxyacetamide.

Nitro Group-Containing Monomer (e2):

Examples include 4-nitrostyrene.

Primary to Tertiary Amino Group-Containing Vinyl Monomer (e3):

Examples include primary amino group-containing vinyl monomers, secondary amino group-containing vinyl monomers, tertiary amino group-containing vinyl monomers, and their hydrochlorides, sulfates, phosphates, and lower alkyl (C1-C8) monocarboxylic acid (such as acetic acid or propionic acid) salts.

Examples of primary amino group-containing vinyl monomers include C3-C6 alkenylamines (such as (meth)allylamine and crotylamine) and aminoalkyl (C2-C6) (meth)acrylates (such as aminoethyl (meth)acrylate).

Examples of secondary amino group-containing vinyl monomers include monoalkylaminoalkyl (meth)acrylates (such as those having an aminoalkyl group (C2-C6) in which one C1-C6 alkyl group is bonded to the nitrogen atom, specifically, such as t-butylaminoethyl (meth)acrylate and methylaminoethyl (meth)acrylate) and C6-C12 dialkenylamines (such as di(meth)allylamine).

Examples of tertiary amino group-containing vinyl monomers include dialkylaminoalkyl (meth)acrylates [such as those having an aminoalkyl group (C2-C6) in which two C1-C6 alkyl groups are bonded to the nitrogen atom, specifically, such as dimethylaminoethyl (meth)acrylate and diethylaminoethyl (meth)acrylate], alicyclic (meth)acrylates having a nitrogen atom [such as morpholinoethyl (meth)acrylate], and aromatic vinyl monomers [such as N,N- diphenylaminoethyl (meth)acrylamide, N,N-dimethylaminostyrene, 4-vinylpyridine, 2-vinylpyridine, N-vinylpyrrole, N-vinylpyrrolidone, and N-vinyl thiopyrrolidone].

Nitrile Group-Containing Vinyl Monomer (e4):
Examples include (meth)acrylonitrile.

The nitrogen-containing vinyl monomer (e) is preferably any of the amide group-containing vinyl monomers (e1) or any of the primary to tertiary amino group-containing vinyl monomers (e3); more preferably N,N-diphenylaminoethyl (meth)acrylamide, N,N-dimethylaminoethyl (meth)acrylamide, N,N-diethylaminoethyl (meth)acrylamide, N,N-dimethylaminopropyl (meth)acrylamide, dimethylaminoethyl (meth)acrylate, or diethylaminoethyl (meth)acrylate; particularly preferably dimethylaminoethyl (meth)acrylate or diethylaminoethyl (meth)acrylate.

Next, a description is given for the hydroxyhydroxy group group-containing vinyl monomer (f).

Hydroxyl Group-Containing Vinyl Monomer (f):
Examples include hydroxy group-containing aromatic vinyl monomers, hydroxyalkyl (C2-C6) (meth)acrylates, mono- or di-hydroxyalkyl (C1-C4)-substituted (meth)acrylamides, vinyl alcohols, C3-C12 alkenols, C4-C12 alkene monools or alkene diols, hydroxyalkyl (C1-C6) alkenyl (C3-C10) ethers, alkenyl (C3-C10) ethers or (meth)acrylates of polyhydric (trihydric to octahydric) alcohols (such as glycerol, pentaerythritol, sorbitol, sorbitan, diglycerol, saccharides, and sucrose), polyoxyalkylene glycol, alkyl (C1-C4) ether mono(meth)acrylates of polyoxyalkylene glycol, and alkyl (C1-C4) ether mono(meth)acrylates of polyoxyalkylene polyol.

Examples of hydroxy group-containing aromatic vinyl monomers include p-hydroxy styrene.

Examples of hydroxyalkyl (C2-C6) (meth)acrylates include 2-hydroxyethyl (meth)acrylate, 2- and 3-hydroxypropyl (meth)acrylate.

Examples of mono- or di-hydroxyalkyl (C1-C4)-substituted (meth)acrylamides include N,N-dihydroxymethyl (meth)acrylamide, N,N-dihydroxypropyl (meth)acrylamide, and N,N-di-2-hydroxybutyl (meth)acrylamide.

Examples of C3-C12 alkenols include (meth)allyl alcohol, crotyl alcohol, isocrotyl alcohol, 1-octanol, and 1-undecenol.

Examples of C4-C12 alkene monools or alkene diols include 1-buten-3-ol, 2-buten-1-ol, and 2-butene-1,4-diol.

Examples of hydroxyalkyl (C1-C6) alkenyl (C3-C10) ethers include 2-hydroxyethylpropenyl ether.

Examples of alkenyl (C3-$C_{10}$) ethers or (meth)acrylates of polyhydric (trihydric to octahydric) alcohols (such as glycerol, pentaerythritol, sorbitol, sorbitan, diglycerol, saccharides, and sucrose) include sucrose (meth)allyl ether.

Examples of polyoxyalkylene glycol include polyoxyalkylene glycol in which the alkylene group has 2 to 4 carbon atoms and the polymerization degree is 2 to 50.

Examples of polyoxyalkylene polyols include trihydric to octahydric alcohol polyoxyalkylene ethers (the alkylene group has 2 to 4 carbon atoms and the polymerization degree is 2 to 100).

Examples of alkyl (C1-C4) ether mono(meth)acrylates of polyoxyalkylene glycol or polyoxyalkylene polyol include polyethylene glycol (number average molecular weight, hereinafter abbreviated to Mn: 100 to 300) mono(meth) acrylate, polypropylene glycol (Mn: 130 to 500) mono (meth)acrylate, and methoxy polyethylene glycol (Mn: 110 to 310) (meth)acrylate.

Next, a description is given for the phosphorus-containing vinyl monomer (g).

Examples of the phosphorus-containing monomer (g) include the following monomers (g1) and (g2).

Phosphate Group-Containing Monomer (g1):
Examples include (meth)acryloyloxyalkyl (C2-C4) phosphates (such as (meth)acryloyloxyethyl phosphate, (meth) acryloyloxyisopropyl phosphate), and alkenyl phosphates (such as vinyl phosphate, allyl phosphate, propenyl phosphate, isopropenyl phosphate, butenyl phosphate, pentenyl phosphate, octenyl phosphate, decenyl phosphate, and dodecenyl phosphate).

Phosphono Group-Containing Monomer (g2):
Examples include (meth)acryloyloxy alkyl (C2-C4) phosphonic acids (such as (meth)acryloyloxyethyl phosphonic acid) and alkenyl (C2-C12) phosphonic acids (such as vinyl phosphonic acid, allyl phosphonic acid, and octenyl phosphonic acid).

The phosphorus-containing monomer (g) is preferably any of the phosphate group-containing monomers (g1), more preferably a (meth)acryloyloxyalkyl (C2-C4) phosphate, particularly preferably (meth)acryloyloxyethyl phosphate.

The copolymer (A) is preferably a copolymer further containing, as a monomer unit, a monomer (h) having two or more unsaturated groups, in addition to the monomers (a) and (b), in terms of viscosity index improving effect and low-temperature viscosity of the lubricant composition.

Examples of the monomer (h) having two or more unsaturated groups include divinylbenzene, C4-C12 alkadienes (specifically, such as butadiene, isoprene, 1,4-pentadiene, 1,6-heptadiene, and 1,7-octadiene), (di)cyclopentadiene, vinylcyclohexene, ethylidenebicycloheptene, limonene, ethylene di(meth)acrylate, polyalkylene oxide glycol di(meth)acrylate, pentaerythritol triallyl ether, trimethylolpropane tri(meth)acrylate, and esters disclosed in WO 01/009242 such as an ester of an unsaturated carboxylic acid having an Mn of 500 or more and glycol and an ester of an unsaturated alcohol and a carboxylic acid.

The copolymer (A) may contain, as monomer units, the following monomers (i) to (o) in addition to the monomers (a) and (b).

Aliphatic Hydrocarbon Monomer (i):
Examples include C2-C20 alkenes (specifically, such as ethylene, propylene, butene, isobutylene, pentene, heptene, diisobutylene, octene, dodecene, and octadecene).

Alicyclic Hydrocarbon Monomer (j):
Examples include cyclopentene, cyclohexene, cycloheptene, cyclooctene, and pinene.

Aromatic Hydrocarbon-Based Monomer (k):
Examples include styrene, α-methylstyrene, vinyltoluene, 2,4-dimethylstyrene, 4-ethylstyrene, 4-isopropylstyrene, 4-butylstyrene, 4-phenylstyrene, 4-cyclohexylstyrene, 4-benzylstyrene, 4-crotylbenzene, indene, and 2-vinylnaphthalene.

Vinyl Esters, Vinyl Ethers, Vinyl Ketones (l):
Examples include vinyl esters of C2-C12 saturated fatty acids (specifically, such as vinyl acetate, vinyl propionate, vinyl butyrate, and vinyl octanoate), C1-C12 alkyl, aryl, or alkoxyalkyl vinyl ethers (specifically, such as methyl vinyl ether, ethyl vinyl ether, propyl vinyl ether, butyl vinyl ether, 2-ethylhexyl vinyl ether, phenyl vinyl ether, vinyl-2-methoxyethyl ether, and vinyl-2-butoxyethyl ether), and C1-C8 alkyl or aryl vinyl ketones (specifically, such as methyl vinyl ketone, ethyl vinyl ketone, and phenyl vinyl ketone).

Epoxy Group-Containing Monomer (m):
Examples include glycidyl (meth)acrylate and glycidyl (meth)allyl ether.

Halogen-Containing Monomer (n):

Examples include vinyl chloride, vinyl bromide, vinylidene chloride, (meth)allyl chloride, and halogenated styrene (such as dichlorostyrene).

Ester of Unsaturated Polycarboxylic Acid (o):

Examples include alkyl, cycloalkyl, or aralkyl esters of unsaturated polycarboxylic acids.

Examples of cycloalkyl or aralkyl esters include C1-C8 alkyl diesters of unsaturated dicarboxylic acids (such as maleic acid, fumaric acid, and itaconic acid), specifically, such as dimethyl maleate, dimethyl fumarate, diethyl maleate, and dioctyl maleate.

In terms of viscosity index improving effect and low-temperature viscosity of the lubricant composition, the percentage of the alkyl (meth)acrylate (a) whose alkyl group contains 5 or more carbon atoms constituting the copolymer (A) is preferably 25 to 62% by weight, more preferably 45 to 62% by weight, particularly preferably 48 to 62% by weight, most preferably 50 to 60% by weight, based on the weight of the copolymer (A).

The percentage of the alkyl (meth)acrylate (b) whose alkyl group contains 1 to 4 carbon atoms constituting the copolymer (A) is usually 38 to 75% by weight. In terms of viscosity index improving effect and low-temperature viscosity of the lubricant composition, the percentage is preferably 38 to 55% by weight, more preferably 38 to 52% by weight, particularly preferably 40 to 50% by weight, most preferably 42 to 48% by weight, based on the weight of the copolymer (A).

When the copolymer (A) contains the monomers (e) to (g) as monomer units, the percentage of each of the monomers (e) to (g) constituting the copolymer (A) is preferably 0.1 to 10% by weight, more preferably 0.5 to 5% by weight, particularly preferably 1 to 3% by weight based on the weight of the copolymer (A), in terms of viscosity index improving effect and low-temperature viscosity of the lubricant composition.

When the copolymer (A) contains the monomers (h) to (i) as monomer units, the percentage of each of the monomers (h) to (i) constituting the copolymer (A) is preferably 0.1 to 15% by weight, more preferably 1 to 12% by weight, particularly preferably 2 to 10% by weight based on the weight of the copolymer (A), in terms of viscosity index improving effect and low-temperature viscosity of the lubricant composition.

When the copolymer (A) contains the monomer (j) as a monomer unit, the percentage of the monomer (j) constituting the copolymer (A) is preferably 0.01 to 200 ppm, more preferably 0.05 to 50 ppm, particularly preferably 0.1 to 20 ppm, based on the weight of the copolymer (A), in terms of viscosity index improving effect and low-temperature viscosity of the lubricant composition.

When the copolymer (A) contains the monomers (k) to (o) as monomer units, the percentage of each of the monomers (k) to (o) constituting the copolymer (A) is preferably 0.1 to 10% by weight, more preferably 1 to 7% by weight, particularly preferably 2 to 5% by weight, based on the weight of the copolymer (A), in terms of viscosity index improving effect and low-temperature viscosity of the lubricant composition.

The copolymer (A) preferably has a solubility parameter (hereinafter abbreviated to SP value) of 9.0 to 9.5 $(cal/cm^3)^{1/2}$, more preferably 9.1 to 9.4 $(cal/cm^3)^{1/2}$, still more preferably 9.2 to 9.3 $(cal/cm^3)^{1/2}$, in terms of viscosity index improving effect and solubility in the lubricant base oil.

The SP values of the copolymer (A) and the lubricant base oil are values calculated by the Fedors' method as described in Polymer Engineering and Science (February 1974, Vol. 14, No. 2, pp. 147 to 154).

The SP value of the copolymer (A) is determined by calculating SP values of the monomer units of the copolymer (A) by the above method and averaging the obtained SP values of the monomer units based on the molar fractions of the monomer units.

In terms of viscosity index improving effect and solubility in the lubricant base oil, the copolymer (A) preferably has a degree of solubility parameter variance of 0.35 to 1.00, more preferably 0.40 to 0.65, still more preferably 0.42 to 0.55, particularly preferably 0.45 to 0.50, most preferably 0.45 to 0.48. When the value is outside the above ranges, the viscosity index improving effect may be insufficient.

The degree of solubility parameter variance of the copolymer (A) can be calculated by the following mathematical formula (2). The degree of solubility parameter variance of the copolymer (A) can be controlled to a predetermined value by suitably adjusting the molar fraction of each constituent monomer.

[Math 2]

$$\text{(Degree of solubility parameter variance of the copolymer }(A)) = \Sigma\{\text{Molar fraction of each monomer} \times (\text{SP value of homopolymer of each monomer} - \text{SP value of copolymer }(A))^2\} \quad (2)$$

The copolymer (A) preferably has a weight average molecular weight (hereinafter abbreviated to Mw) of 5,000 to 200,000, more preferably 8,000 to 100,000, particularly preferably 10,000 to 65,000, most preferably 15,000 to 60,000, in terms of viscosity index improving effect and shear stability of the lubricant composition.

A Mw of less than 5,000 may result in poor viscosity temperature characteristics improving effect, poor viscosity index improving effect, and increased costs. A Mw of more than 200,000 may result in poor shear stability, poor solubility in the lubricant base oil, and poor storage stability.

The copolymer (A) preferably has a number average molecular weight (hereinafter abbreviated to Mn) of 2,500 or more, more preferably 5,000 or more, particularly preferably 10,000 or more, most preferably 15,000 or more. Meanwhile, the Mn is preferably 200,000 or less, more preferably 80,000 or less, particularly preferably 60,000 or less, most preferably 40,000 or less. A Mn of less than 2,500 may result in poor viscosity temperature characteristics improving effect, poor viscosity index improving effect, and increased costs. A Mn of more than 200,000 may result in poor shear stability, poor solubility in the lubricant base oil, and poor storage stability.

The Mn and Mw of the copolymer (A) can be measured by gel permeation chromatography (hereinafter abbreviated to GPC) under the following conditions.

<Conditions for Measurement of Mn and Mw of the Copolymer (A)>

Device: HLC-802A (Tosoh Corporation)
Column: TSK gel GMH6 (Tosoh Corporation), two columns
Measurement temperature: 40° C.
Sample solution: 0.25% by weight solution in tetrahydrofuran
Amount of solution injected: 100 µl
Detector: Refractive index detector
Standard substance: standard polystyrene (TSK standard polystyrene), 12 samples (molecular weight: 500, 1,050, 2,800, 5,970, 9,100, 18,100, 37,900, 96,400, 190,000, 355, 000, 1,090,000, and 2,890,000) (Tosoh Corporation)

The copolymer (A) preferably has a ratio of Mw to Mn (Mw/Mn) of 1.0 or more, preferably 1.2 or more, more preferably 1.3 or more, still more preferably 1.5 or more, particularly preferably 1.6 or more. Meanwhile, Mw/Mn is preferably 6.0 or less, more preferably 4.0 or less, still more preferably 3.0 or less, particularly preferably 2.0 or less. Mw/Mn of less than 1.0 or more than 6.0 may results in poor viscosity temperature characteristics, i.e., low fuel economy.

The copolymer (A) preferably has a shear stability index (hereinafter abbreviated to PSSI) of 20 or less, more preferably 15 or less, still more preferably 10 or less, particularly preferably 8 or less. Meanwhile, the shear stability index is preferably 0.1 or more, more preferably 0.5 or more, still more preferably 1 or more, particularly preferably 2 or more. A shear stability index of less than 0.1 may result in poor viscosity index improving effect and increased costs. A shear stability index of more than 20 may result in poor shear stability and poor storage stability.

The copolymer (A) preferably has a ratio of Mw to PSSI (Mw/PSSI) of $0.8 \times 10^4$ or more, preferably $1.0 \times 10^4$ or more, more preferably $1.5 \times 10^4$ or more, still more preferably $1.8 \times 10^4$ or more, particularly preferably $2.0 \times 10^4$ or more. Mw/PSSI of less than $0.8 \times 10^4$ may result in poor viscosity temperature characteristics, i.e., low fuel economy.

The copolymer (A) preferably has a crystallization temperature of $-20°$ C. or lower, more preferably $-30°$ C. or lower, particularly preferably $-40°$ C. or lower, most preferably $-50°$ C. or lower, in terms of low-temperature viscosity of the lubricant composition.

The crystallization temperature of the copolymer (A) is measured using a differential scanning calorimeter "Unix (registered trademark) DSC7" (PerkinElmer). It is a crystallization temperature observed when a sample (5 mg) of the copolymer (A) is cooled from $100°$ C. to $-60°$ C. isothermally at a rate of $10°$ C./min.

The copolymer (A) preferably dissolves in an API Group II or III lubricant base oil having a kinetic viscosity at $100°$ C. of 1.5 to 2.5 mm$^2$/s. The term "dissolve" as used herein means that when 100 parts by weight of the copolymer (A) is dissolved in 100 parts by weight of a lubricant base oil, the solution has a uniform appearance and contains no insoluble materials of the copolymer (A).

In a spectrum obtained by nuclear magnetic resonance analysis (13C-NMR), the copolymer (A) preferably has a ratio of M1/M2 of 1.0 or more, wherein M1 is the total area of peaks in the chemical shift range of 29 to 31 ppm relative to the total area of all peaks, and M2 is the total area of peaks in the chemical shift range of 67 to 73 ppm relative to the total area of all peaks.

M1/M2 is preferably 1.0 or more, more preferably 2.0 or more, still more preferably 3.0 or more, particularly preferably 4.0 or more, most preferably 5.0 or more. Meanwhile, M1/M2 is preferably 20 or less, still more preferably 18 or less, particularly preferably 16 or less, most preferably 14 or less. M1/M2 of less than 1.0 may result in insufficient fuel economy and poor low-temperature viscosity characteristics. M1/M2 of more than 20 may result in insufficient fuel economy, poor solubility, and poor storage stability.

In a spectrum obtained by nuclear magnetic resonance analysis (13C-NMR), the copolymer (A) preferably has a ratio of M3/M4 of 0.20 or more, wherein M3 is the total area of peaks in the chemical shift range of 10 to 20 ppm relative to the total area of all peaks, and M4 is the total area of peaks in the chemical shift range of 25 to 35 ppm relative to the total area of all peaks.

M3/M4 is preferably 0.20 or more, more preferably 0.3 or more, still more preferably 0.4 or more, particularly preferably 0.5 or more, most preferably 0.6 or more. Meanwhile, M3/M4 is preferably 5.0 or less, still more preferably 3.0 or less, particularly preferably 2.0 or less, most preferably 1.5 or less. M3/M4 of less than 0.20 may result in insufficient fuel economy and poor low-temperature viscosity characteristics. M3/M4 of more than 5.0 may result in insufficient fuel economy, poor solubility, and poor storage stability.

In a spectrum obtained by nuclear magnetic resonance analysis (13C-NMR), the copolymer (A) preferably has a ratio of M5/M6 of 0.20 or more, wherein M5 is the total area of peaks in the chemical shift range of 44 to 46 ppm relative to the total area of all peaks, and M6 is the total area of peaks in the chemical shift range of 63 to 72 ppm relative to the total area of all peaks.

M5/M6 is preferably 0.20 or more, more preferably 0.3 or more, still more preferably 0.4 or more, particularly preferably 0.5 or more, most preferably 0.6 or more. Meanwhile, M5/M6 is preferably 3.0 or less, more preferably, 2.0 or less, particularly preferably 1.0 or less, most preferably 0.8 or less. M5/M6 of less than 0.20 may result in insufficient fuel economy and poor low-temperature viscosity characteristics. M5/M6 of more than 3.0 may result in insufficient fuel economy, poor solubility, and poor storage stability.

In the case where the copolymer (A) contains diluent oil, a spectrum by nuclear magnetic resonance analysis (13C-NMR) is obtained from a polymer from which the diluent oil is separated by rubber membrane dialysis or the like.

The total area (M1) of peaks in the chemical shift range of 29 to 31 ppm relative to the total area of all peaks indicates the ratio of integrated intensities derived from a specific ethylene structure on a poly(meth)acrylate side chain relative to the total integrated intensity of all carbon atoms, as measured by 13C-NMR. The total area (M2) of peaks in the chemical shift range of 67 to 73 ppm relative to the total area of all peaks indicates the ratio of integrated intensities derived from a specific ether structure on a poly(meth)acrylate side chain relative to the total integrated intensity of all carbon atoms, as measured by 13C-NMR.

The total area (M3) of peaks in the chemical shift range of 10 to 20 ppm relative to the total area of all peaks indicates the ratio of integrated intensities derived from a specific methyl structure on a poly(meth)acrylate side chain relative to the total integrated intensity of all carbon atoms, as measured by 13C-NMR.

The total area (M4) of peaks in the chemical shift range of 25 to 35 ppm relative to the total area of all peaks indicates the ratio of integrated intensities derived from a specific methylene structure on a poly(meth)acrylate side chain relative to the total integrated intensity of all carbon atoms, as measured by 13C-NMR.

The total area (M5) of peaks in the chemical shift range of 44 to 46 ppm relative to the total area of all peaks indicates the ratio of integrated intensities derived from a specific methine structure on a poly(meth)acrylate side chain relative to the total integrated intensity of all carbon atoms, as measured by 13C-NMR.

The total area (M6) of peaks in the chemical shift range of 63 to 72 ppm relative to the total area of all peaks indicates the ratio of integrated intensities derived from carbon atoms adjacent to oxygen atoms on a poly(meth)acrylate side chain relative to the total integrated intensity of all carbon atoms, as measured by 13C-NMR.

M1/M2 indicates the ratio of the specific methylene structure to the specific ether structure on the poly(meth)acrylate side chain. A different method may be used as long as similar results can be obtained. For 13C-NMR measurement, samples (0.1 g each) each diluted with heavy chloroform (2 ml) were measured by the verse gated decoupling method at room temperature with a resonant frequency of 100 MHz.

The following values were determined by the analysis:
(i) the total integrated intensity in the chemical shift range of 10 to 74 ppm (the total integrated intensity attributable to all carbon atoms in the hydrocarbon),
(ii) the total integrated intensity in the chemical shift range of 29 to 31 ppm (the total integrated intensity attributable to a specific β-branched structure),
(iii) the total integrated intensity in the chemical shift range of 67 to 73 ppm (the total integrated intensity attributable to a specific linear structure),
(iv) the total integrated intensity in the chemical shift range of 10 to 20 ppm (the total integrated intensity attributable to a specific β-branched structure),
(v) the total integrated intensity in the chemical shift range of 29 to 31 ppm (the total integrated intensity attributable to a specific linear structure),
(vi) the total integrated intensity in the chemical shift range of 44 to 46 ppm (the total integrated intensity attributable to a specific β-branched structure), and
(vii) the total integrated intensity in the chemical shift range of 63 to 72 ppm (the total integrated intensity attributable to a specific linear structure).

Then, the percentage (%) of the total integrated intensity of (ii) with the total integrated intensity of (i) as 100% was calculated as M1. Likewise, the percentage (%) of each of (iii), (iv), (v), (vi), and (vii) with total integrated intensity of (i) as 100% was calculated as M2, M3, M4, M5, and M6, respectively.

The copolymer (A) can be obtained by a known production method, such as one in which the monomer units of the copolymer (A) are solution-polymerized in a solvent in the presence of a polymerization catalyst.

Examples of the solvent include toluene, xylene, C9-C10 alkyl benzenes, methyl ethyl ketone, ethyl acetate, mineral oil, and ester oil.

Examples of the polymerization catalyst include azo-based catalysts (such as azobisisobutyronitrile and azobis-valeronitrile), peroxide-based catalysts (such as benzoyl peroxide, cumyl peroxide, and lauryl peroxide), and redox-based catalysts (such as a mixture of benzoyl peroxide and a tertiary amine). Any known chain transfer agent (such as a C2-C20 alkyl mercaptan) may further be used, if necessary.

The polymerization temperature is preferably 25° C. to 150° C., more preferably 50° C. to 130° C. The copolymer (A) can be obtained by bulk polymerization, emulsion polymerization, or suspension polymerization, other than the solution polymerization.

The polymerization form of the copolymer (A) is not limited. For example, the copolymer (A) may be a random addition polymer, an alternating polymer, a graft copolymer, or a block copolymer.

The viscosity index improver of the present invention may contain, in addition to the copolymer (A), a (co)polymer (B) containing a high molecular weight monomer (r) as a monomer unit.

The (co)polymer (B) preferably contains at least one of the alkyl (meth)acrylate (a) whose alkyl group contains 5 or more carbon atoms and the alkyl (meth)acrylate (b) whose alkyl group contains 1 to 4 carbon atoms, as a monomer unit other than the high molecular weight monomer (r), in terms of viscosity index improving effect.

The high molecular weight monomer (r) may be obtained by any of the following methods:

an esterification reaction of a (meth)acrylic acid and a hydroxy group-containing (co)polymer obtained by introducing a hydroxy group at only one end of a hydrocarbon polymer containing, as a monomer unit, at least one monomer selected from the group consisting of C2-C10 alkenes and C2-C10 alkadienes;

an amidation reaction of a (meth)acrylic acid and an amino group-containing (co)polymer obtained by introducing an amino group at only one end of a hydrocarbon polymer containing, as a monomer unit, at least one monomer selected from the group consisting of C2-C10 alkenes and C2-C10 alkadienes; or a transesterification between a methyl (meth)acrylate and the hydrocarbon polymer, hydroxy group-containing (co)polymer, or amino group-containing (co)polymer.

Examples of C2-C10 alkenes in the hydrocarbon polymer include ethylene, propylene, normal butene, and isobutene.

Examples of C2-C10 alkadienes in the hydrocarbon polymer include butadiene and isoprene.

When the hydrocarbon polymer has a double bond, the double bond may be partially or completely hydrogenated by hydrogenation.

The Mn of the hydrocarbon polymer is preferably 700 to 50,000 in terms of viscosity index improving effect.

The Mn of the high molecular weight monomer (r) is preferably 700 to 50,000, more preferably 1,500 to 5,000 in terms of viscosity index improving effect.

The percentage of the high molecular weight monomer (r) constituting the (co)polymer (B) is preferably 2 to 60% by weight, more preferably 5 to 55% by weight, particularly preferably 10 to 50% by weight, most preferably 15 to 45% by weight based on the weight of the (co)polymer (B), in terms of viscosity index improving effect and low-temperature viscosity of the lubricant composition.

The (co)polymer (B) preferably has a Mw of 100,000 to 1,000,000. The lower limit is more preferably 150,000, still more preferably 200,000, particularly preferably 250,000, most preferably 300,000. The upper limit is more preferably 800,000, still more preferably 700,000, particularly preferably 600,000, most preferably 550,000. A Mw of less than 150,000 may result in poor viscosity temperature characteristics improving effect, poor viscosity index improving effect, and increased costs. A Mw of more than 1,000,000 may result in poor shear stability, poor solubility in the lubricant base oil, and poor storage stability.

The (co)polymer (B) preferably has a Mn of 50,000 or more, more preferably 80,000 or more, particularly preferably 100,000 or more, most preferably 120,000 or more. Meanwhile, the Mn is preferably 500,000 or less, more preferably 300,000 or less, particularly preferably 250,000 or less, most preferably 200,000 or less. A Mn of less than 50,000 may result in poor viscosity temperature characteristics improving effect, poor viscosity index improving effect, and increased costs. A Mn of more than 500,000 may result in poor shear stability, poor solubility in the lubricant base oil, and poor storage stability.

The (co)polymer (B) preferably has a ratio of Mw to PSSI (Mw/PSSI) of $0.8 \times 10^4$ or more, more preferably $1.0 \times 10^4$ or more, still more preferably $1.5 \times 10^4$ or more, particularly more preferably $1.8 \times 10^4$ or more, most preferably $2.0 \times 10^4$ or more. Mw/PSSI of less than $0.8 \times 10^4$ may result in poor viscosity temperature characteristics, i.e., low fuel economy.

The Mn and Mw of the (co)polymer (B) can be measured under the same conditions as for the Mn and Mw of the copolymer (A).

The (co)polymer (B) preferably has a ratio of Mw to Mn (Mw/Mn) of 0.5 or more, more preferably 1.0 or more, still more preferably 1.5 or more, particularly more preferably 2.0 or more, most preferably 2.1 or more. Meanwhile, Mw/Mn is preferably 6.0 or less, more preferably 4.0 or less, still more preferably 3.5 or less, particularly preferably 3.0 or less. Mw/Mn of less than 0.5 or more than 6.0 may result in poor viscosity temperature characteristics, i.e., low fuel economy.

As is the case with the copolymer (A), the (co)polymer (B) can be obtained by a known production method.

When the viscosity index improver of the present invention contains the (co)polymer (B), the amount of the (co)polymer (B) based on the weight of the copolymer (A) is preferably 0.01 to 30% by weight, more preferably 0.01 to 20% by weight, particularly preferably 0.01 to 10% by weight, in terms of low-temperature viscosity.

The viscosity index improver of the present invention may contain an alkyl (meth)acrylate (co)polymer (C) other than the copolymer (A), in addition to the copolymer (A).

The alkyl (meth)acrylate (co)polymer (C) may be any alkyl (meth)acrylate (co)polymer other than the copolymer (A), such as an alkyl(meth)acrylate (co)polymer having a C1-C18 linear alkyl group.

Specific examples of the alkyl (meth)acrylate (co)polymer (C) include an n-octadecyl methacrylate/n-dodecyl methacrylate (molar ratio of 10-30/90-70) copolymer, an n-tetradecyl methacrylate/n-dodecyl methacrylate (molar ratio of 10-30/90-70) copolymer, an n-hexadecyl methacrylate/n-dodecyl methacrylate/methyl methacrylate (molar ratio of 20-40/55-75/0-10) copolymer, and an n-dodecyl acrylate/n-dodecyl methacrylate (molar ratio of 10-40/90-60) copolymer. The viscosity index improver of the present invention may contain one or two or more of these compounds.

When the viscosity index improver of the present invention contains the alkyl (meth)acrylate (co)polymer (C), the amount of the alkyl (meth)acrylate (co)polymer (C) based on the weight of the copolymer (A) is preferably 0.01 to 30% by weight, more preferably 0.01 to 20% by weight, particularly preferably 0.01 to 10% by weight, in terms of low-temperature viscosity.

Next, a description is given for a lubricant composition containing the viscosity index improver of the present invention and a lubricant base oil, wherein the lubricant base oil has a kinetic viscosity at 100° C. of 1.4 to 2.5 mm$^2$/s. The lubricant composition of the present invention also encompasses such a lubricant composition.

First, the lubricant composition of the present invention contains the viscosity index improver of the present invention. Since the viscosity index improver of the present invention has been described, the description thereof is omitted here.

Next, a description is given for the lubricant base oil to be contained in the lubricant composition of the present invention.

The lubricant base oil to be contained in the lubricant composition of the present invention preferably has a kinetic viscosity at 40° C. of 4.0 to 6.0 mm$^2$/s. The lubricant base oil to be contained in the lubricant composition of the present invention may be a lubricant base oil having a viscosity index of 90 to 125.

The lubricant composition of the present invention may contain any lubricant base oil that satisfies the above conditions. Specifically, a lubricant fraction obtained from crude oil by evaporation under normal pressure and/or reduced pressure is refined by one or a combination of two or more of refining treatments such as solvent deasphalting, solvent extraction, hydrocracking, solvent dewaxing, catalytic dewaxing, hydrorefining, sulfuric acid washing, and clay treatment. Any of the resulting refined paraffin base oil, normal paraffin base oil, isoparaffin base oil, and ester synthetic base oil can be used as the lubricant base oil as long as it satisfies the above conditions.

Preferred examples of the lubricant base oil to be contained in the lubricant composition of the present invention include a lubricant base oil that can be obtained by refining a lubricant fraction recovered from raw oil and GTL (gas to liquid) oil by a predetermined refining method and recovering the lubricant fraction. Hereinafter, the base oil derived from crude oil is also expressed as "high-purity mineral base oil" and the base oil derived from GTL oil is also expressed as "GTL base oil".

Preferred examples of the predetermined refining method include hydrorefining such as hydrocracking and hydrofinishing; solvent refining such as furfural solvent extraction; dewaxing such as solvent dewaxing and catalytic dewaxing; clay refining using acid clay, activated clay, or the like; chemical (acid or alkali) washing such as sulfuric acid washing and caustic soda washing. In the present invention, these refining methods may be used alone or in combination of two or more thereof. When two or more refining methods are used in combination, these methods can be performed in any appropriate order.

Any catalyst may be used in the hydrocracking, but a hydrocracking catalyst and a hydroisomerization catalyst are preferred.

The hydrocracking catalyst may be obtained by causing a metal having a hydrogenation function (such as one or more metals in Group VIa and Group VIII of the periodic table) to be carried on a carrier. The carrier of the hydrocracking catalyst may include a complex oxide having cracking activity (such as silica-alumina, alumina-boria, or silica-zirconia) or a combination of two or more of such complex oxides bonded together by a binder.

The hydroisomerization catalyst may be obtained by causing at least one Group VIII metal having a hydrogenation function to be carried on a carrier. The carrier of the hydroisomerization catalyst may include zeolite (such as ZSM-5, zeolite beta, or SAPO-11).

The hydrocracking catalyst and the hydroisomerization catalyst may be used in combination in the form of a stack or mixture, for example.

Ester synthetic base oil: Examples include esters (such as diesters, triesters, and tetraesters) of C2-C18 polyhydric (dihydric to hexahydric) alcohols (e.g., dihydric alcohols such as ethylene glycol, propylene glycol, and hexamethylene diol; trihydric alcohols such as glycerol and trimethylolpropan; tetrahydric alcohols such as pentaerythritol; and pentahydric to hexahydric alcohols) and C4-C24 aliphatic monocarboxylic acids (such as hexanoic acid, octanoic acid, and decanoic acid) or dicarboxylic acids (such as adipic acid and azelaic acid).

The kinetic viscosity at 100° C. of the lubricant base oil to be contained in the lubricant composition of the present invention must not exceed 2.5 mm/s. The upper limit is preferably 2.4 mm$^2$/s, more preferably 2.3 mm$^2$/s, still more preferably 2.2 mm$^2$/s, particularly preferably 2.1 mm$^2$/s, most preferably 2.0 mm$^2$/s. Meanwhile, the kinetic viscosity at 100° C. must not fall below 1.4 mm$^2$/s. The lower limit is preferably 1.5 mm$^2$/s, more preferably 1.6 mm$^2$/s, still more preferably 1.7 mm$^2$/s, particularly preferably 1.8 mm$^2$/s. The term "kinetic viscosity at 100° C." as used herein refers to the kinetic viscosity at 100° C. as specified in ASTM D-445. A kinetic viscosity at 100° C. of the lubricant base oil of more than 2.5 mm$^2$/s may result in poor low-temperature viscosity characteristics and insufficient fuel economy. A kinetic viscosity at 100° C. of less than 1.4 mm²/s may result in poor lubricity due to insufficient oil film formation at a lubrication point as well as high evaporation loss of the lubricant composition.

The upper limit of the kinetic viscosity at 40° C. of the lubricant base oil to be contained in the lubricant composition of the present invention is preferably 6.0 mm²/s, more preferably 5.9 mm²/s, still more preferably 5.8 mm²/s, particularly preferably 5.7 mm²/o, most preferably 5.5 mm²/s. Meanwhile, the lower limit of the kinetic viscosity at 40° C. is preferably 4.0 mm²/s, more preferably 4.1 mm²/s, still more preferably 4.2 mm²/s, particularly preferably 4.3 mm²/s, most preferably 4.5 mm²/s. A kinetic viscosity at 40° C. of the lubricant base oil of more than 6.0 mm²/s may result in poor low-temperature viscosity characteristics and insufficient fuel economy. A kinetic viscosity at 40° C. of less than 4.0 mm²/s may result in poor lubricity due to insufficient oil film formation at a lubrication point as well as high evaporation loss of the lubricant composition.

The viscosity index of the lubricant base oil to be contained in the lubricant composition of the present invention is preferably 90 to 125, more preferably 95 to 120, still more preferably 100 to 110. If the viscosity index is lower than 90, the thermal and oxidative stability and anti-volatility properties tend to decrease, and frictional coefficient tends to increase. If the viscosity index exceeds 125, the low-temperature viscosity characteristics tend to decrease.

The term "viscosity index" as used herein refers to the viscosity index in accordance with ASTM D-2270.

The lubricant base oil to be contained in the lubricant composition of the present invention preferably has a density value (ρ15) at 15° C. of equal to or lower than the value ρ represented by the following formula (3), i.e., (ρ15)≤ρ, although depending on the viscosity grade of the lubricant base oil.

$$\rho = 0.0025 \times kv100 + 0.816 \quad (3)$$

wherein kv100 indicates a value of the kinetic viscosity (mm²/s) at 100° C. of the lubricant base oil.

In the case where (ρ15)>ρ, the viscosity-temperature characteristics, thermal and oxidative stability, anti-volatility properties, and low-temperature viscosity characteristics tend to decrease, possibly resulting in poor fuel economy.

Specifically, the lubricant base oil to be contained in the lubricant composition of the present invention preferably has a density value (ρ15) at 15° C. of 0.860 or less, more preferably 0.850 or less, still more preferably 0.840 or less, particularly preferably 0.822 or less.

The term "density at 15° C." as used herein refers to the density measured at 15° C. in accordance with JIS K 2249-1: 2011.

In addition, the lubricant base oil to be contained in the lubricant composition of the present invention preferably has a pour point of −10° C. or lower, more preferably −12.5° C. or lower, still more preferably −15° C. or lower. If the pour point exceeds the upper limit, the low-temperature fluidity of the lubricant as a whole tends to decrease. The term "pour point" as used herein refers to the pour point measured in accordance with JIS K 2269: 1987.

In addition, the lubricant base oil to be contained in the lubricant composition of the present invention preferably has an aniline point (° C.) value (AP) equal to or higher than the value α represented by the following formula (4), i.e., AP≥α.

$$\alpha = 4.3 \times kv100 + 100 \quad (4)$$

wherein kv100 indicates a value of the kinetic viscosity (mm²/s) at 100° C. of the lubricant base oil.

When AP<α, the thermal and oxidative stability, anti-volatility properties, and low-temperature viscosity characteristics tend to decrease. In addition, in such a case, additives added to the lubricant base oil tend to have lower effects. The term "aniline point" as used herein refers to the aniline point measured in accordance with JIS K 2256: 2013.

The lubricant base oil to be contained in the lubricant composition of the present invention preferably has an iodine value of 3 or less, more preferably 2 or less, still more preferably 1 or less, particularly preferably 0.9 or less, most preferably 0.8 or less. Meanwhile, in terms of economic efficiency, the iodine value is preferably 0.001 or more, more preferably 0.01 or more, still more preferably 0.03 or more, particularly preferably 0.05 or more. The thermal and oxidative stability can be improved by adjusting the iodine value of the lubricant base oil to 3 or less. The term "iodine value" as used herein refers to the iodine value measured by the indicator titration method specified in JIS K 0070: 1992.

The amount of sulfur components in the lubricant base oil in the lubricant composition of the present invention is preferably 100 ppm by weight or less, more preferably 50 ppm by weight or less, still more preferably 10 ppm by weight or less, particularly preferably 5 ppm by weight or less.

The amount of nitrogen components in the lubricant base oil in the lubricant composition of the present invention is preferably 7 ppm by weight or less, more preferably 5 ppm by weight or less, still more preferably 3 ppm by weight or less. An amount of nitrogen components of more than 5 ppm by weight tends to result in poor thermal and oxidative stability. The term "nitrogen components" as used herein refers to the nitrogen components measured in accordance with JIS K 2609: 1998.

The lubricant base oil to be contained in the lubricant composition of the present invention essentially has a % CA of 5 or less, more preferably 2 or less, still more preferably 1 or less, particularly preferably 0.5 or less. If the % CA of the lubricant base oil exceeds the upper limit, the thermal and oxidative stability and the friction characteristics tend to decrease.

The lubricant base oil to be contained in the lubricant composition of the present invention preferably has a % CP of 70 or more, more preferably 80 to 99, still preferably 85 to 95, particularly preferably 87 to 94, most preferably 90 to 94. If the % CP of the lubricant base oil is lower than the lower limit, the thermal and oxidative stability and the friction characteristics tend to decrease. If the % CP of the lubricant base oil exceeds the upper limit, the additives tend to have poor solubility.

The lubricant base oil to be contained in the lubricant composition of the present invention preferably has a % CN of 30 or less, more preferably 4 to 25, still more preferably 5 to 13, particularly preferably 5 to 8. If the % CN of the lubricant base oil exceeds the upper limit, the thermal and oxidative stability and the friction characteristics tend to decrease. If the % CN is lower than the lower limit, the additives tend to have poor solubility.

The terms "% CP", "% CN", and "% CA" as used herein respectively refer to the percentage of the paraffin carbon number relative to the total carbon number, the percentage of the naphthene carbon number relative to the total carbon number, and the percentage of the aromatic carbon number relative to the total carbon number, as determined by a method in accordance with ASTM D 3238-85 (n-d-M ring analysis). Specifically, the preferred ranges of % CP, % CN, and % CA are based on the values determined by the method, and for example, there is a case where the lubricant base oil not containing naphthene exhibits a % CN of greater than zero as measured by the method.

The amount of saturated components in the lubricant base oil in the lubricant composition of the present invention is not particularly limited as long as the kinetic viscosity at 100° C. satisfies the above conditions. Yet, based on the total weight of the lubricant base oil, the amount of saturated components is preferably 90% by weight or more, more preferably 95% by weight or more, still more preferably 99% by weight or more. The percentage of cyclic saturated components in the saturated components is preferably 40% by weight or less, preferably 35% by weight or less, more preferably 30% by weight or less, still preferably 25% by weight or less, particularly more preferably 21% by weight or less. When the amount of saturated components and the percentage of cyclic saturated components in the saturated components satisfy the above conditions, improved viscosity-temperature characteristics and improved thermal and oxidative stability can be achieved. In addition, when additives are added to the lubricant base oil, the additives are allowed to exhibit their functions to a higher degree while they remain sufficiently stably dissolved in the lubricant base oil. Further, the present invention can improve friction characteristics of the lubricant base oil itself, which results in improved friction reduction, and in turn, improved energy saving performance.

The "amount of saturated components" herein are measured by a method described in ASTM D 2007-93.

The amount of the aromatic components in the lubricant base oil in the lubricant composition of the present invention is preferably 5% by weight or less, more preferably 4% by weight or less, still more preferably 3% by weight or less. Meanwhile, the amount is preferably 0.1% by weight or more, more preferably 0.5% by weight or more, still more preferably 1% by weight or more, particularly preferably 1.5% by weight or more. If the amount of the aromatic components exceeds the upper limit, the thermal and oxidative stability, friction characteristics, anti-volatility properties, and low-temperature viscosity characteristics tend to decrease.

The term "amount of the aromatic components" as used herein refers to the value that is determined in accordance with ASTM D 2007-93. The aromatic components generally include, in addition to alkyl benzene and alkyl naphthalene, anthracene, phenanthrene, and alkylates thereof, as well as compounds in which four or more benzene rings are condensed, and aromatic compounds having heteroatoms such as pyridines, quinolines, phenols, and naphthols.

The lubricant base oil to be contained in the lubricant composition of the present invention preferably has a urea adduct value of 5% by weight or less, more preferably 3% by weight or less, still more preferably 2.5% by weight or less, particularly preferably 2% by weight or less. Meanwhile, the urea adduct value is preferably 0.1% by weight or more, more preferably 0.5% by weight or more, particularly preferably 0.8% by weight or more, in terms of sufficient low-temperature viscosity characteristics.

The term "urea adduct value" as used herein refers to the value that is determined by the following method. A sample oil (lubricant base oil) in an amount of 100 g is poured into a round-bottom flask, and urea (200 mg), toluene (360 ml) and methanol (40 ml) are added thereto, followed by stirring at room temperature for six hours. This results in white granular crystals as a urea adduct in the reaction mixture. The reaction mixture is then filtered through a 1-micron filter to collect the generated white granular crystals. The obtained granular crystal are washed six times with toluene (50 ml). The collected white crystals are placed in a flask, and deionized water (300 ml) and toluene (300 ml) are added thereto, followed by stirring at 80° C. for one hour. The aqueous phase is separated and removed with a separating funnel, and the toluene phase is washed three times with deionized water (300 ml). Desiccant (sodium sulfate) is added to the toluene phase to remove water, and the toluene is distilled off. The percentage (weight percent) of the thus-obtained the urea adduct relative to the sample oil is defined as the urea adduct value.

The lubricant composition of the present invention may contain the lubricant base oil by itself, or may contain the lubricant base oil in combination with one or two or more other base oils. When the lubricant composition of the present invention contains the lubricant base oil and other base oil(s), the percentage of the lubricant base oil in the base oil mixture is preferably 30% by weight or more, more preferably 50% by weight or more, still more preferably 70% by weight or more.

Examples of other base oils that may be contained in the lubricant composition of the present invention include mineral base oil and synthetic lubricant base oil.

The mineral base oil has, for example, a kinetic viscosity at 100° C. of 1 to 100 $mm^2/s$. Examples include solvent refined mineral oil, hydrocracked mineral oil, hydrorefined mineral oil, and solvent dewaxing base oil.

Examples of the synthetic lubricant base oil include those whose kinetic viscosity at 100° C. does not satisfy the above conditions, such as poly-α-olefins and hydrogenated products thereof, isobutene oligomers and hydrogenated products thereof, isoparaffins, alkyl benzenes, alkyl naphthalenes, diesters (specifically, such as ditridecyl glutarate, di-2-ethylhexyl adipate, diisodecyl adipate, ditridecyl adipate, and di-2-ethylhexyl sebacate), polyol esters (specifically, such as trimethylolpropane caprylate, trimethylolpropane pelargonate, pentaerythritol 2-ethyl hexanoate, and pentaerythritol pelargonate), polyoxyalkylene glycol, dialkyldiphenyl ether, and polyphenyl ether. Of these, poly-α-olefins are preferred. Typical examples of poly-α-olefins as the base oil include oligomers or cooligomers of C2-C32 (preferably C6-C16) α-olefins (specifically, such as 1-octene oligomer, decene oligomer, and ethylene/propylene cooligomer) and hydrogenated products thereof.

The method for producing poly-α-olefins or the like is not particularly limited. Examples include a method in which a α-olefin is polymerized in the presence of a polymerization catalyst such as a Friedel-Crafts catalyst containing a complex of aluminum trichloride or boron trifluoride with water, an alcohol (such as ethanol, propanol, or butanol), and a carboxylic acid or ester.

The lubricant base oil contained in the lubricant composition of the present invention is preferably high-purity mineral base oil, GTL base oil, or synthetic lubricant base oil, in terms of viscosity index improving effect and low-temperature viscosity of the lubricant composition.

Next, a description is given for properties of the lubricant composition of the present invention.

The lubricant composition of the present invention preferably has a viscosity index of 250 to 450, more preferably 280 to 430, still more preferably 290 to 410, particularly preferably 300 to 400, most preferably 350 to 380. If the lubricant composition of the present invention has a viscosity index of less than 250, the lubricant composition may not be able to improve fuel economy or reduce the low-temperature viscosity at −40° C. If the lubricant composition of the present invention has a viscosity index of more than 450, the lubricant composition may result in poor low-temperature fluidity and may cause defects due to poor solubility of the additives.

The lubricant composition of the present invention preferably has a kinetic viscosity at 100° C. of 4.2 to 7.0 mm$^2$/s in terms of low-temperature viscosity. The upper limit of the kinetic viscosity at 100° C. is more preferably 5.6 mm$^2$/s, still more preferably 5.5 mm$^2$/s, particularly preferably 5.4 mm$^2$/s, most preferably 5.3 mm$^2$/s. Meanwhile, the lower limit of the kinetic viscosity at 100° C. is more preferably 4.3 mm$^2$/s, still more preferably 4.4 mm$^2$/s, particularly preferably 4.5 mm$^2$/s, in terms of viscosity index improving effect and evaporation characteristics. A kinetic viscosity at 40° C. of less than 4.2 mm$^2$/s may result in insufficient lubricity. A kinetic viscosity at 40° C. of more than 5.7 mm$^2$/s may result in insufficient low-temperature viscosity and insufficient fuel economy.

The lubricant composition of the present invention preferably has a kinetic viscosity at 40° C. of 4 to 50 mm$^2$/s. The upper limit of the kinetic viscosity at 40'C is more preferably 45 mm$^2$/s, still more preferably 40 mm$^2$/s, particularly preferably 35 mm$^2$/s, further particularly preferably 30 mm$^2$/s, most preferably 27 mm$^2$/s. Meanwhile, the lower limit of the kinetic viscosity at 40° C. is more preferably 5 mm$^2$/s, still more preferably 10 mm$^2$/s, particularly preferably 15 mm$^2$/s, further particularly preferably 20 mm$^2$/s. A kinetic viscosity at 40° C. of less than 4 mm$^2$/s may result in insufficient lubricity. A kinetic viscosity at 40° C. of more than 50 mm$^2$/s may result in insufficient low-temperature viscosity and insufficient fuel economy.

The upper limit of the HTHS viscosity at 100° C. of the lubricant composition of the present invention is preferably 6.0 mPa·s, more preferably 5.5 mPa·s, still more preferably 5.3 mPa·s, particularly preferably 5.0 mPa·s, most preferably 4.5 mPa·s. Meanwhile, the lower limit of the HTHS viscosity at 100° C. is preferably 3.0 mPa·s, more preferably 3.5 mPa·s, still more preferably 3.8 mPa·s, particularly preferably 4.0 mPa·s, most preferably 4.2 mPa·s. The term "HTHS viscosity at 100° C." as used herein refers to the high-temperature high-shear viscosity at 100° C. as specified in ASTM D4683. A HTHS viscosity at 100° C. of less than 3.0 mPa·s may result in highly evaporative properties and insufficient lubricity. A HTHS viscosity at 100° C. of more than 6.0 mPa· may result in insufficient low-temperature viscosity and insufficient fuel economy.

The upper limit of the HTHS viscosity at 150° C. of the lubricant composition of the present invention is preferably 3.5 mPa·s, more preferably 3.0 mPa·s, still more preferably 2.8 mPa·s, particularly preferably 2.7 mPa·s. Meanwhile, the lower limit of the HTHS viscosity at 150° C. is preferably 2.0 mPa·s, more preferably 2.3 mPa·s, still more preferably 2.4 mPa·s, particularly preferably 2.5 mPa·s, most preferably 2.6 mPa·s. The term "HTHS viscosity at 150° C." as used herein refers to the high-temperature high-shear viscosity at 150° C. specified in ASTM D 4683. A HTHS viscosity at 150° C. of less than 2.0 mPa·s may result in highly evaporative properties and insufficient lubricity. A HTHS viscosity at 150° C. of more than 3.5 mPa·s may result in insufficient low-temperature viscosity and insufficient fuel economy.

In the lubricant composition of the present invention, the ratio of the HTHS viscosity at 100° C. to the HTHS viscosity at 150° C. preferably satisfies the condition represented by the following formula (5).

$$\text{HTHS (100° C.)/HTHS (150° C.)} \leq 2.04 \tag{5}$$

wherein HTHS (100° C.) indicates the HTHS viscosity at 100° C., and HTHS (150° C.) indicates the HTHS viscosity at 150° C.

The upper limit of HTHS (100° C.)/HTHS (150° C.) is preferably 2.04, more preferably 2.00, still more preferably 1.98, particularly preferably 1.80, most preferably 1.70. A HTHS (100° C.)/HTHS (150° C.) of more than 2.04 may result in insufficient fuel economy and insufficient low-temperature characteristics. The lower limit of HTHS (100° C.)/HTHS (150° C.) is preferably 0.50, more preferably 0.70, still more preferably 1.00, particularly preferably 1.30. HTHS (100° C.)/HTHS (150° C.) of less than 0.50 may result in insolubility of the additives and a significant increase in the cost of base materials.

In the lubricant composition of the present invention, the lubricant base oil preferably contains the viscosity index improver such that the amount of the copolymer (A) in the viscosity index improver is 0.1 to 50% by weight based on the weight of the lubricant base oil.

In the case of using the lubricant composition as engine oil, the lubricant base oil preferably contains the viscosity index improver such that the amount of the copolymer (A) is 0.1 to 20% by weight based on the lubricant base oil.

In the case of using the lubricant composition as gear oil, the lubricant base oil preferably contains the viscosity index improver such that the amount of the copolymer (A) is 1 to 50% by weight based on the weight of the lubricant base oil.

In the case of using the lubricant composition as automatic transmission fluid (such as ATF or belt-CVTF), the lubricant base oil preferably contains the viscosity index improver such that the amount of the copolymer (A) is 10 to 70% by weight based on the weight of the lubricant base oil.

In the case of using the lubricant composition as traction fluid, the lubricant base oil preferably contains the viscosity index improver such that the amount of the copolymer (A) is 0.5 to 20% by weight based on the weight of the lubricant base oil.

The upper limit of the shear stability (hereinafter abbreviated to "SS") of the lubricant composition of the present invention is preferably 10%. In terms of friction reduction and wear prevention after long hour drive, the upper limit is more preferably 9%, still more preferably 8%, particularly preferably 7%, most preferably 6%. Meanwhile, in terms of reduction of the amount of the viscosity index improver to be used, the lower limit of SS is more preferably 0.5%, still more preferably 1%, particularly preferably 1.5%. When the SS exceeds 10%, wear easily occurs between metals and seizure of metals easily occurs, possibly resulting in insufficient fuel economy.

The lubricant composition of the present invention preferably has a low-temperature viscosity at −40° C. of 5,000 mPa·s or less, more preferably 4,500 mPa·s or less, still more preferably 4,000 mPa·s or less, in terms of engine initial start-up.

The lubricant composition of the present invention is suitably used as gear oil (such as differential fluid and industrial gear oil), MTF, transmission fluid (such as ATF and belt-CVTF), traction fluid (such as Toroidal-CVTF), shock absorber oil, power steering fluid, hydraulic fluid (such as hydraulic fluid for construction machinery and industrial hydraulic fluid), or the like. Of these, the use as gear oil, MTF, transmission fluid, or traction fluid is preferred; the use as differential fluid, MTF, ATF, or belt-CVTF is more preferred; and the use as MTF, ATF, or belt-CVTF is particularly preferred.

The lubricant composition of the present invention may contain various additives. Examples of additives include dispersants, detergents, antioxidants, oiliness improvers, pour point depressants, friction and wear modifiers, extreme pressure additives, defoamers, demulsifiers, corrosion inhibitors, ashless dispersants, wear inhibitors, metal deactivators, and sulfur-based additives. These additives may be used alone or in combination of two or more thereof.

Examples of dispersants include succinimide (bis- or mono-polybutenyl succinimide), Mannich condensation products, and borates.

Examples of detergents include basic, overbased, or neutral metal salts, salicylates, phenates, naphthenates, carbonates, phosphonates, and mixtures thereof.

Examples of basic, overbased, or neutral metal salts include overbased salts or alkaline earth metal salts of sulfonates (such as petroleum sulfonate, alkyl benzene sulfonate, and alkyl naphthalene sulfonate). Examples of detergents of such overbased or alkaline earth metal salts of sulfonates include a calcium sulfonate detergent.

Examples of antioxidants include ashless antioxidants of phenol type, amine type, and the like, and metal-based antioxidants of zinc type, copper type, molybdenum type, and the like.

Examples of phenolic antioxidants include 4,4'-methylenebis(2,6-di-tert-butylphenol), 4,4'-bis(2,6-di-tert-butylphenol), 4,4'-bis(2-methyl-6-tert-butylphenol), 2,2'-methylenebis(4-ethyl-6-tert-butylphenol), 2,2'-methylenebis(4-methyl-6-tert-butylphenol), 4,4'-butylidenebis(3-methyl-6-tert-butylphenol), 4,4'-isopropylidenebis(2,6-di-tert-butylphenol), 2,2'-methylenebis(4-methyl-6-nonylphenol), 2,2'-isobutylidenebis(4,6-dimethylphenol), 2,2'-methylenebis(4-methyl-6-cyclohexylphenol), 2,6-di-tert-butyl-4-methylphenol, 2,6-di-tert-butyl-4-ethylphenol, 2,4-dimethyl-6-tert-butylphenol, 2,6-di-tert-α-dimethylamino-p-cresol, 2,6-di-tert-butyl-4-(N,N-dimethylaminomethylphenol), 4,4'-thiobis(2-methyl-6-tert-butylphenol), 4,4'-thiobis(3-methyl-6-tert-butylphenol), 2,2'-thiobis(4-methyl-6-tert-butylphenol), bis(3-methyl-4-hydroxy-5-tert-butylbenzyl)sulfide, bis(3,5-di-tert-butyl-4-hydroxybenzyl)sulfide, 2,2'-thio-diethylenebis[3-(3,5-di-tert-butyl-4-hydroxyphenyl)propionate], tridecyl-3-(3,5-di-tert-butyl-4-hydroxyphenyl)propionate, pentaerythrityl-tetrakis[3-(3,5-di-tert-butyl-4-hydroxyphenyl)propionate], octyl-3-(3,5-di-tert-butyl-4-hydroxyphenyl)propionate, stearyl 3-(3,5-di-tert-butyl-4-hydroxyphenyl)propionate, and octyl-3-(3-methyl-5-di-tert-butyl-4-hydroxyphenyl)propionate. These may be used in combination of two or more thereof.

Examples of amine-based antioxidants include diphenylamine.

Examples of oiliness improvers include long-chain fatty acids and esters thereof (such as oleic acid and oleate) and long-chain amines and amides thereof (such as oleylamine and oleylamide).

Examples of pour point depressants include copolymers of long-chain alkyl methacrylates (the carbon number of the alkyl group is 12 to 18).

Examples of friction and wear modifiers include molybdenum compounds and zinc compounds (such as molybdenum dithiophosphate, molybdenum dithiocarbamate, and zinc dialkyldithiophosphate) as well as oleylamine.

Examples of extreme pressure additives include sulfur compounds (mono- or disulfide, sulfoxide, and sulfur phosphide compounds), phosphide compounds, and chlorine compounds (such as chlorinated paraffin).

Examples of defoamers include silicone oil, metal soap, fatty acid esters, and phosphate compounds.

Examples of demulsifiers include quaternary ammonium salts (such as a tetraalkylammonium salt), sulfated oil, and phosphates (such as phosphate with a non-ionic surfactant containing polyoxyethylene).

Examples of corrosion inhibitors include nitrogen-containing compounds (such as benzotriazole and 1,3,4-thiadiazolyl-2,5-bisdialkyldithiocarbamate).

Examples of ashless dispersants include succinimide.

Examples of wear inhibitors include phosphoric acid.

Examples of metal deactivators include thiadiazole.

Examples of sulfur-based additives include sulfate.

These additives may be used alone or in combination of two or more thereof, if necessary. A mixture of these additives may be referred to as a functional additive.

A method for producing a lubricant composition of the present invention includes mixing the viscosity index improver of the present invention and a lubricant base oil having a kinetic viscosity at 100° C. of 1.4 to 2.5 mm$^2$/s. The method may also include a step of mixing various additives.

Hereinafter, the present invention is described in detail with reference to examples, but the present invention is not limited thereto.

EXAMPLES

Hereinafter, the present invention is described in detail with reference to examples, but the present invention is not limited thereto.

Examples 1 to 8 and Comparative Examples 1 to 4 (Evaluation of Viscosity Index Improver)

Lubricant base oils (100 parts by weight, each) described in Table 1 were charged into separate reaction vessels each equipped with a stirring device, a heating and cooling device, a thermometer, a dropping funnel, a nitrogen inlet tube, and a pressure reducing device. Separately, in accordance with Table 1, monomers, dodecyl mercaptan as a chain transfer agent, 2,2'-azobis(2,4-dimethylvaleronitrile) (0.5 parts by weight), and 2,2'-azobis(2-methylbutyronitrile) (0.2 parts by weight) were charged into glass beakers. In each glass beaker, the components were mixed under stirring at 20° C. to prepare a monomer solution, which was then poured into the dropping funnel. After the gas phase was purged with nitrogen in each reaction vessel, the monomer solutions were added dropwise to the respective reaction vessels over two hours while the temperature in the hermetic systems was maintained at 70° C. to 85° C. Each mixture was aged at 85° C. for two hours after completion of the dropwise addition. Then, the temperature was raised to 120° C. to 130° C. At this temperature, unreacted monomers were removed over two hours under reduced pressure (0.027 to 0.040 MPa). Thus, viscosity index improvers (R1) to (R8) and (S1) to (S4) respectively containing copolymers (A1) to (A8) and (H1) to (H4) were obtained.

The SP value and the degree of solubility parameter variance of each of the obtained copolymers (A1) to (A8) and (H1) to (H4) were calculated by the methods described above. The Mw was measured by the method described above. In addition, the low-temperature storage stability of each of the viscosity index improvers (R1) to (R8) and (S1) to (S4) was measured by the following method. Table 1 shows the results.

<Method for Evaluating the Low-Temperature Storage Stability of the Viscosity Index Improver>

Each of the viscosity index improvers (R1) to (R8) and (S1) to (S4) in an amount of 10% by weight was added to the lubricant base oils (base oils 1 to 4) described in Table 1, and uniformly mixed. The appearance of each mixture after 24 hours of storage at −25° C. was visually observed to evaluate the low-temperature storage stability by the following evaluation criteria.
[Evaluation Criteria]
Good: The appearance is uniform, and the copolymer is completely dissolved.
Poor: The appearance is not uniform, and the copolymer is not completely dissolved.

(e3-1): N,N-dimethylaminoethyl methacrylate
(f-1): Hydroxyethyl methacrylate
(g1-1): Methacryloyloxyethyl phosphate Properties of the lubricant base oils (the base oils 1 to 4) are as described below.

(Base oil 1): high-purity mineral base oil (YUBASE-2 available from SK; kinetic viscosity at 100° C.: 2.2 mm$^2$/s, kinetic viscosity at 40° C.: 7.4 mm$^2$/s, viscosity index: 99, % CP: 78 wt %, % CA: 0.1 wt %, urea adduct value: 0)

TABLE 1

|  |  | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|
| Viscosity index improver |  | (R1) | (R2) | (R3) | (R4) | (R5) | (R6) | (R7) | (R8) | (S1) | (S2) | (S3) | (S4) |
| Lubricant base oil |  | Base oil 1 | Base oil 1 | Base oil 1 | Base oil 1 | Base oil 1 | Base oil 1 | Base oil 2 | Base oil 4 | Base oil 1 | Base oil 3 | Base oil 3 | Base oil 3 |
| Copolymer |  | (A1) | (A2) | (A3) | (A4) | (A5) | (A6) | (A7) | (A8) | (H1) | (H2) | (H3) | (H4) |
| Monomer (parts by weight) | (a1-1) | 55 | 45 | — | — | — | 35 | 30 | 20 | — | — | — | — |
|  | (a1-2) | — | — | 40 | — | 35 | 23 | — | — | — | — | — | — |
|  | (a1-3) | — | — | — | 54 | — | — | — | — | — | — | — | — |
|  | (a2-1) | — | — | — | — | — | — | — | — | — | — | — | 40 |
|  | (a2-2) | — | 8 | — | 3 | — | — | — | — | 60 | — | — | — |
|  | (a2-3) | — | — | 10 | — | 14 | — | 30 | 10 | — | 60 | — | — |
|  | (a3-1) | — | — | 5 | — | — | — | — | — | — | — | — | — |
|  | (a3-2) | — | — | — | — | — | — | — | — | — | — | — | — |
|  | (a3-3) | — | 3 | — | — | — | — | — | — | — | — | 35 | 22 |
|  | (a3-4) | — | — | — | — | — | — | — | — | — | — | 35 | — |
|  | (b-1) | 45 | 45 | 45 | 43 | 38 | 40 | 38 | 70 | 40 | 40 | 30 | 38 |
|  | (b-2) | — | — | — | — | 10 | — | — | — | — | — | — | — |
|  | (c3-1) | — | — | — | — | 3 | — | — | — | — | — | — | — |
|  | (f-1) | — | — | — | — | — | — | 2 | — | — | — | — | — |
|  | (g1-1) | — | — | — | — | — | 2 | — | — | — | — | — | — |
| Subtotal |  | 100 | 101 | 100 | 100 | 100 | 100 | 100 | 100 | 100 | 100 | 100 | 100 |
| Dodocyl mercaptan (parts by weight) |  | 0.96 | 0.96 | 0.96 | 0.96 | 0.96 | 2.00 | 0.96 | 0.92 | 0.96 | 0.96 | 0.96 | 0.96 |
| Molar-average carbon number (Q) of alkyl group of (a) |  | 32.0 | 28.3 | 29.0 | 35.1 | 32.1 | 32.8 | 29.9 | 30.6 | 24.0 | 28.0 | 17.0 | 18.4 |
| SP values of (A), (H) |  | 9.20 | 9.21 | 9.22 | 9.17 | 9.22 | 9.19 | 9.22 | 9.18 | 9.18 | 9.15 | 9.18 | 9.21 |
| Low-temperature storage stability |  | Good | Good | Good | Good | Good | Good | Good | Good | Good | Good | Poor | Good |
| Degree of solubility parameter variance of (A), (H) |  | 0.47 | 0.47 | 0.46 | 0.48 | 0.41 | 0.83 | 0.99 | 0.44 | 0.44 | 0.45 | 0.34 | 0.40 |
| Mw of (A), (H) (×10$^4$) |  | 3 | 3 | 3 | 3 | 3 | 1.5 | 6 | 3 | 3 | 3 | 3 | 3 |

The compositions of the monomers (a) to (g) shown in Table 1 are described below.
(a1-1): 2-Tetradecyloctadecyl methacrylate (esterified product of ISOFOL 32 available from Sasol and methacrylic acid) (carbon number: 32)
(a1-2): 2-Tetradecylicosyl methacrylate (carbon number: 34)
(a1-3): 2-Hexadecylicosyl methacrylate (carbon number: 36)
(a2-1): 2-Octyldodecyl methacrylate (carbon number: 20)
(a2-2): 2-N-decyltetradecyl methacrylate (carbon number: 24)
(a2-3): 2-Dodecyihexadecyl methacrylate (carbon number: 28)
(a3-1): n-Dodecyl methacrylate (carbon number: 12)
(a3-2): n-Tetradecyl methacrylate (carbon number: 14)
(a3-3): n-Hexadecyl methacrylate (carbon number: 16)
(a3-4): n-Octadecyl methacrylate (carbon number: 18)
(b-1): Methyl methacrylate (carbon number: 1)
(b-2): n-Butyl methacrylate (carbon number: 4)

(Base oil 2): poly-α-olefin base oil (SpectraSyn 2 available from Exxon Mobil; kinetic viscosity at 100° C.: 1.7 mm$^2$/s, kinetic viscosity at 40°: 5.0 mm$^2$/s, viscosity index: incompatible, urea adduct value: 0)

(Base oil 3): mineral base oil (SN80 available from H&R Tudapetrol; kinetic viscosity at 100° C.: 3.4 nmm/s, kinetic viscosity at 40° C.: 15.4 mm$^2$/s, viscosity index: 89, % CP: 63 wt %, % CA: 3 wt %)

(Base oil 4): ester synthetic base oil (dioctyl adipate available from J-PLUS Co., Ltd.; kinetic viscosity at 100° C.: 2.3 mm$^2$/s, kinetic viscosity at 40° C.: 7.7 mm$^2$/s, viscosity index: 118)

Production Example 1

The following components were charged into a reaction vessel equipped with a stirring device, a heating and cooling device, a thermometer, and a nitrogen inlet tube: the base oil 1 (400 parts by weight) as the lubricant base oil; a mixture (100 parts by weight) of hydrogenated polybutadiene monomethacrylate (Mn: 5,000) (20 parts), the monomer (b-2) (65 parts), the monomer (a3-1) (10 parts), and the monomer (a3-2) (5 parts); and 2,2'-azobis(2-methylbutyronitrile) (0.15 parts by weight). After the reaction vessel was purged with nitrogen (gas-phase oxygen concentration: 100 ppm), the temperature was raised to 76° C. under stirring in hermetic conditions. At this temperature, a polymerization reaction was carried out for four hours. The temperature was raised to 120° C. to 130° C., and at this temperature, unreacted monomers were removed over two hours under reduced pressure (0.027 to 0.040 MPa). Thus, a viscosity index improver (T1) (Mw: 450,000) containing the copolymer (B1) was obtained.

Examples 9 to 16 and Comparative Examples 5 to 8 (Evaluation of Lubricant Compositions)

According to Table 2, the viscosity index improvers (R1) to (R8), (S1) to (S4), and (T1) were each mixed with a lubricant base oil and functional additives (including a metal-based (calcium sulfonate-based; TBN: 300 mg KOH/g) detergent, an ashless dispersant (succinimide), a friction modifier (oleylamide), a wear inhibitor (phosphoric acid), an antioxidant (diphenylamine), a metal deactivator (thiadiazole), and a sulfur-based additive (sulfate)) in stainless steel containers each equipped with a stirring device in such a manner that each of the resulting lubricant compositions would have a kinetic viscosity at 100° C. of 4.50±0.02 (mm²/s). Thus, lubricant compositions (V1) to (V8) and (W1) to (W4) were obtained.

The viscosity index, kinetic viscosity at 40° C., viscosity index, shear stability, and low-temperature viscosity (−40° C.) of the lubricant compositions (V1) to (V8) and (W1) to (W4) were measured by methods described below. Table 2 shows the results.

Examples 17 to 24 and Comparative Examples 9 to 12 (Evaluation of Lubricant Compositions)

According to Table 3, the viscosity index improvers (R1) to (R8), (S1) to (S4), and (T1) were each mixed with a lubricant base oil and the functional additives in stainless steel containers each equipped with a stirring device in such a manner that each of the resulting lubricant compositions would have a kinetic viscosity at 100'C of 5.50±0.02 (mm²/s). Thus, lubricant compositions (V9) to (V16) and (W5) to (W8) were obtained.

The viscosity index, kinetic viscosity at 40° C., viscosity index, shear stability, and low-temperature viscosity (−40° C.) of the lubricant compositions (V9) to (V16) and (W5) to (W8) were measured by methods described below. Table 3 shows the results.

<Method for Calculating the Viscosity Index of Lubricant Compositions>

The kinetic viscosities at 40° C. and 100° C. were measured by the method of ASTM D 445, and the viscosity index was calculated by the method of ASTM D 2270.

<Methods for Measuring and Calculating the Shear Stability of Lubricant Compositions>

Based on a procedure similar to the method of JASO M347-2007, the shear stability was measured by changing the test time from 1 hour to 10 hours. The shear stability was calculated by the method of JASO M347-2007.

<Method for Measuring the Low-Temperature Viscosity (−40° C.) of Lubricant Compositions>

The low-temperature viscosity was measured at −40° C. by the method of ASTM D 2983.

TABLE 2

| | | Example 9 | Example 10 | Example 11 | Example 12 | Example 13 | Example 14 | Example 15 |
|---|---|---|---|---|---|---|---|---|
| | Viscosity index improver (R), (S) | (R1) | (R2) | (R3) | (R4) | (R5) | (R6) | (R7) |
| | Lubricant base oil | Base oil 1 | Base oil 1 | Base oil 1 | Base oil 1 | Base oil 1 | Base oil 1 | Base oil 2 |
| | Lubricant composition | (V1) | (V2) | (V3) | (V4) | (V5) | (V6) | (V7) |
| Amount (parts by weight) | Viscosity index improver (R), (S) | 21.0 | 20.6 | 20.5 | 20.1 | 20.6 | 34.2 | 25.6 |
| | Viscosity index improver (T1) | 2 | — | — | — | — | — | 2 |
| | Lubricant base oil | Balance | Balance | Balance | Balance | Balance | Balance | Balance |
| | Functional additives | 10 | 10 | 10 | 10 | 10 | 10 | 10 |
| | Total | 100 | 100 | 100 | 100 | 100 | 100 | 100 |
| | Kinetic viscosity at 100° C. (mm²/s) | 4.5 | 4.5 | 4.5 | 4.5 | 4.5 | 4.5 | 4.5 |
| | Kinetic viscosity at 40° C. (mm²/s) | 13.8 | 13.9 | 13.9 | 14.0 | 14.0 | 13.7 | 11.7 |
| | Viscosity index | 282 | 280 | 279 | 275 | 277 | 285 | 376 |
| | Low-temperature viscosity (mPa·s) | 4,000 | 2,100 | 1,600 | 4,100 | 2,100 | 2,800 | 3,200 |
| | Shear stability (%) | 2.4 | 2.2 | 2.4 | 2.7 | 2.4 | 0.8 | 3.8 |

| | | Example 16 | Comparative Example 5 | Comparative Example 6 | Comparative Example 7 | Comparative Example 8 |
|---|---|---|---|---|---|---|
| | Viscosity index improver (R), (S) | (R8) | (S1) | (S2) | (S3) | (S4) |
| | Lubricant base oil | Base oil 4 | Base oil 1 | Base oil 3 | Base oil 3 | Base oil 3 |
| | Lubricant composition | (V8) | (W1) | (W2) | (W3) | (W4) |
| Amount (parts by weight) | Viscosity index improver (R), (S) | 21.6 | 21.3 | 20.3 | 9.1 | 8.6 |
| | Viscosity index improver (T1) | — | — | — | — | — |
| | Lubricant base oil | Balance | Balance | Balance | Balance | Balance |
| | Functional additives | 10 | 10 | 10 | 10 | 10 |
| | Total | 100 | 100 | 100 | 100 | 100 |

TABLE 2-continued

|  | | | | | |
|---|---|---|---|---|---|
| Kinetic viscosity at 100° C. (mm²/s) | 4.5 | 4.5 | 4.5 | 4.5 | 4.5 |
| Kinetic viscosity at 40° C. (mm²/s) | 12.8 | 14.5 | 17.7 | 18.2 | 17.8 |
| Viscosity index | 320 | 258 | 160 | 171 | 178 |
| Low-temperature viscosity (mPa · s) | 1,800 | 1,300 | 45,000 | 1,000,000 | 4,600 |
| Shear stability (%) | 6.5 | 2.4 | 1.8 | 2.0 | 1.8 |

TABLE 3

|  |  |  | Example 17 | Example 18 | Example 19 | Example 20 | Example 21 | Example 22 |
|---|---|---|---|---|---|---|---|---|
| Viscosity index improver (R), (S) | | | (R1) | (R2) | (R3) | (R4) | (R5) | (R6) |
| Lubricant base oil | | | Base oil 1 | Base oil 1 | Base oil 1 | Base oil 1 | Base oil 1 | Base oil 1 |
| Lubricant composition | | | (V9) | (V10) | (V11) | (V12) | (V13) | (V14) |
| Amount (parts by weight) | Viscosity index improver (R), (S) | | 25.4 | 25.4 | 25.3 | 24.2 | 23.4 | 38.1 |
| | Viscosity index improver (T1) | | 2 | — | — | — | — | — |
| | Lubricant base oil | | Balance | Balance | Balance | Balance | Balance | Balance |
| | Functional additives | | 10 | 10 | 10 | 10 | 10 | 10 |
| Total | | | 100 | 100 | 100 | 100 | 100 | 100 |
| Kinetic viscosity at 100° C. (mm²/s) | | | 5.5 | 5.5 | 5.5 | 5.5 | 5.5 | 5.5 |
| Kinetic viscosity at 40° C. (mm²/s) | | | 16.4 | 16.7 | 16.7 | 16.9 | 18.8 | 18.7 |
| Viscosity index | | | 319 | 316 | 315 | 311 | 313 | 315 |
| Low-temperature viscosity (mPa · s) | | | 4,300 | 2,500 | 2,000 | 4,000 | 3,600 | 3,200 |
| Shear stability (%) | | | 3.5 | 3.5 | 3.5 | 3.8 | 3.3 | 1.8 |

|  |  |  | Example 23 | Example 24 | Comparative Example 9 | Comparative Example 10 | Comparative Example 11 | Comparative Example 12 |
|---|---|---|---|---|---|---|---|---|
| Viscosity index improver (R), (S) | | | (R7) | (R8) | (S1) | (S2) | (S3) | (S4) |
| Lubricant base oil | | | Base oil 2 | Base oil 4 | Base oil 1 | Base oil 3 | Base oil 3 | Base oil 3 |
| Lubricant composition | | | (V15) | (V16) | (W5) | (W6) | (W7) | (W8) |
| Amount (parts by weight) | Viscosity index improver (R), (S) | | 30.2 | 28.8 | 25.4 | 14.0 | 13.8 | 13.8 |
| | Viscosity index improver (T1) | | 2 | — | — | — | — | — |
| | Lubricant base oil | | Balance | Balance | Balance | Balance | Balance | Balance |
| | Functional additives | | 10 | 10 | 10 | 10 | 10 | 10 |
| Total | | | 100 | 100 | 100 | 100 | 100 | 100 |
| Kinetic viscosity at 100° C. (mm²/s) | | | 5.5 | 5.5 | 5.5 | 5.5 | 5.5 | 5.5 |
| Kinetic viscosity at 40° C. (mm²/s) | | | 14.0 | 14.8 | 17.9 | 21.8 | 22.5 | 22.0 |
| Viscosity index | | | 415 | 350 | 283 | 208 | 188 | 206 |
| Low-temperature viscosity (mPa · s) | | | 3,500 | 2,000 | 2,000 | 50,000 | 1,000,000 | 5,200 |
| Shear stability (%) | | | 5.5 | 8.8 | 3.8 | 2.8 | 3.1 | 2.8 |

As is clear from the results of Table 2, each of the lubricant compositions (Examples 9 to 16) containing one of the viscosity index improvers of the present invention has higher viscosity index improving effect and lower low-temperature viscosity. In contrast, the lubricant compositions of Comparative Examples 5 to 8 are inferior in at least one of these effects. In addition, as is clear from the results of Table 3, each of the lubricant compositions (Examples 17 to 24) containing one of the viscosity index improvers of the present invention similarly has high viscosity index improving effect and low low-temperature viscosity. In contrast, the lubricant compositions of Comparative Examples 9 to 12 are inferior in at least one of these effects.

INDUSTRIAL APPLICABILITY

The lubricant composition containing the viscosity index improver of the present invention is suitable as a drive-line lubricant (such as MTF, differential gear oil, ATF, or belt-CVTF), hydraulic fluid (such as hydraulic fluid for machinery, power steering fluid, or shock absorber oil), engine oil (such as gasoline engine oil or diesel engine oil), or traction fluid.

The invention claimed is:

1. A viscosity index improver comprising:
a copolymer (A) containing, as monomer units, an alkyl (meth)acrylate (a), and an alkyl (meth)acrylate (b) whose alkyl group contains 1 carbon atom,
wherein the alkyl group of the alkyl (meth)acrylate (a) has a molar-average carbon number (Q) of 29 or more and 40 or less,
wherein the alkyl (meth)acrylate (a) comprises 20 to 55% by weight of one or more compounds selected from the group consisting of 2-tetradecyloctadecyl (meth)acrylate, 2-tetradecylicosyl (meth)acrylate, and 2-hexadecylicosyl (meth)acrylate, up to 30% by weight of a monomer (a2) represented by the following formula (2), and up to 5% by weight of an alkyl (meth)acrylate (a3) having a C12-C18 linear alkyl group, based on the weight of the copolymer (A), and wherein the alkyl (meth)acrylate (a) is contained as a monomer unit in an amount of 30 to 60% by weight based on the weight of the copolymer (A), wherein the alkyl (meth)acrylate (b) whose alkyl group contains 1 carbon atom is contained as a monomer unit in an amount of 38 to 75% by weight based on the weight of the copolymer (A), wherein a total amount of the alkyl (meth)acrylate (a) and the alkyl (meth)acrylate (b) whose alkyl group contains 1 carbon atom is at least 97% by weight based on the weight of the copolymer (A), and wherein the viscosity index improver has a molecular weight of 15,000 to 200,000:

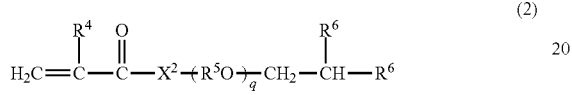

(2)

wherein $R^4$ is a hydrogen atom or a methyl group; $—X^2—$ is a group represented by $—O—$, q is an integer of 0; and each $R^6$ is independently a C8-C14 linear or branched alkyl group.

2. The viscosity index improver according to claim 1, wherein the copolymer (A) has a solubility parameter of 9.0 to 9.5 $(cal/cm^3)^{1/2}$.

3. The viscosity index improver according to claim 1, wherein the copolymer (A) has a degree of solubility parameter variance of 0.35 to 1.00.

4. The viscosity index improver according to claim 1, wherein the copolymer (A) has a weight average molecular weight of 5,000 to 200,000.

5. The viscosity index improver according to claim 1, wherein the copolymer (A) is a copolymer further containing, as a monomer unit, at least one selected from the group consisting of a nitrogen-containing vinyl monomer (e), a hydroxy group-containing vinyl monomer (f), and a phosphate group-containing vinyl monomer (g).

6. The viscosity index improver according to claim 1, further comprising a (co)polymer (B) containing a high molecular weight monomer (r) as a monomer unit.

7. A lubricant composition comprising:
the viscosity index improver according to claim 1; and
a lubricant base oil,
wherein the lubricant base oil has a kinetic viscosity at 100° C. of 1.4 to 2.5 $mm^2/s$,
wherein the viscosity index improver is contained in an amount of 20.1 to 38.1% by weight in the lubricant composition, and
wherein the lubricant composition has a viscosity index of at least 250.

8. The lubricant composition according to claim 7, wherein the lubricant base oil has a kinetic viscosity at 40° C. of 4.0 to 6.0 $mm^2/s$.

9. The lubricant composition according to claim 7, wherein the lubricant base oil has a viscosity index of 90 to 125.

10. The lubricant composition according to claim 7, wherein the lubricant composition has a kinetic viscosity at 100° C. of 4.2 to 7.0 $mm^2/s$ and a viscosity index of 250 to 450.

11. The lubricant composition according to claim 7, wherein the lubricant composition has a shear stability of 10% or less.

12. The lubricant composition according to claim 7, wherein the lubricant composition has a low-temperature viscosity at −40° C. of 5,000 mPa·s or less.

13. The lubricant composition according to claim 7, wherein the lubricant base oil is at least one selected from the group consisting of high-purity mineral base oil, GTL base oil, and synthetic lubricant base oil.

14. The lubricant composition according to claim 7, further comprising at least one additive selected from the group consisting of a dispersant, a detergent, an antioxidant, an oiliness improver, a pour point depressant, a friction and wear modifier, an extreme pressure additive, a defoamer, a demulsifier, and a corrosion inhibitor.

15. A method for producing a lubricant composition, the method comprising the step of:
mixing the viscosity index improver according to claim 1 and a lubricant base oil having a kinetic viscosity at 100° C. of 1.4 to 2.5 $mm^2/s$.

16. The viscosity index improver according to claim 1, wherein after mixing 10% by weight of the viscosity index improver with a lubricant base oil and maintaining the mixture at −25° C. for 24 hours, the viscosity improver is completely dissolved in the lubricant base oil,
wherein the lubricant base oil is high-purity mineral base oil, poly-α-olefin base oil or ester synthetic base oil, and has a kinetic viscosity at 100° C. of 1.4 to 2.5 $mm^2/s$.

* * * * *